United States Patent
Kim et al.

(10) Patent No.: US 12,124,681 B2
(45) Date of Patent: Oct. 22, 2024

(54) MOBILE TERMINAL HAVING A DISPLAY THAT ENLARGERS A FRONT DISPLAY REGION IN RESPONSE TO BEING SWITCHED TO AN EXTENDED DISPLAY MODE

(71) Applicant: LG ELECTRONICS INC., Seoul (KR)

(72) Inventors: Changmok Kim, Seoul (KR); Jinhee Lee, Seoul (KR); Eunkyung Choi, Seoul (KR); Junho Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/757,592

(22) PCT Filed: Dec. 31, 2019

(86) PCT No.: PCT/KR2019/018782
§ 371 (c)(1),
(2) Date: Jun. 17, 2022

(87) PCT Pub. No.: WO2021/137318
PCT Pub. Date: Jul. 8, 2021

(65) Prior Publication Data
US 2023/0017891 A1    Jan. 19, 2023

(51) Int. Cl.
*G06F 3/0484* (2022.01)
*G06F 1/16* (2006.01)
(Continued)

(52) U.S. Cl.
CPC .......... *G06F 3/0484* (2013.01); *G06F 1/1624* (2013.01); *G06F 1/1652* (2013.01);
(Continued)

(58) Field of Classification Search
CPC .... G06F 1/1652; G06F 1/1641; G06F 1/1624; G06F 1/1622; G06F 2203/04803;
(Continued)

(56) References Cited

U.S. PATENT DOCUMENTS 9,921,714 B1* 3/2018 Shapiro ............... G06F 3/04817
9,996,212 B2* 6/2018 Sun ........................ G06F 3/0481
(Continued)

FOREIGN PATENT DOCUMENTS

CN    110246422    9/2019
EP    2469817    6/2012
(Continued)

OTHER PUBLICATIONS

PCT International Application No. PCT/KR2019/018782, Written Opinion and International Search Report dated Sep. 29, 2020, 12 pages.

(Continued)

*Primary Examiner* — Nicholas Ulrich
(74) *Attorney, Agent, or Firm* — LEE, HONG, DEGERMAN, KANG & WAIMEY

(57) ABSTRACT

The purpose of the present invention is to provide: a mobile terminal allowing a user to conveniently determine execution screens of at least two applications to be displayed in a multitasking manner and layouts therefor; and a method for controlling same. Provided according to an aspect of the present invention is a mobile terminal comprising: a body; a display coupled to the body such that a display region viewed from the front of the body can vary depending on switching between an extended display mode and a retracted display mode; and a control unit for performing control such that, in response to switching from the retracted display mode to the extended display mode, multiple layout indi- (Continued)

cators for multiple application execution screens are displayed or multiple application icons are displayed.

17 Claims, 27 Drawing Sheets

(51) Int. Cl.

| | |
|---|---|
| G06F 3/04817 | (2022.01) |
| G06F 3/0482 | (2013.01) |
| G06F 3/04842 | (2022.01) |
| G06F 3/0488 | (2022.01) |
| G06F 3/04886 | (2022.01) |
| H04M 1/02 | (2006.01) |
| H04M 1/72403 | (2021.01) |
| H04M 1/72448 | (2021.01) |
| H04M 1/72469 | (2021.01) |

(52) U.S. Cl.
CPC .......... *G06F 1/1677* (2013.01); *G06F 3/0482* (2013.01); *G06F 3/04842* (2013.01); *G06F 3/0488* (2013.01); *G06F 3/04886* (2013.01); *H04M 1/0237* (2013.01); *H04M 1/0241* (2013.01); *H04M 1/72403* (2021.01); *H04M 1/72448* (2021.01); *H04M 1/72469* (2021.01); *G06F 3/04817* (2013.01); *G06F 2203/04803* (2013.01); *H04M 1/0268* (2013.01)

(58) Field of Classification Search
CPC .............. G06F 1/1677; G06F 3/04886; G06F 3/04817; G06F 3/0482; G06F 3/0484; G06F 3/04842; G06F 3/0488; H04M 1/0241; H04M 1/0237; H04M 1/0268; H04M 1/72403; H04M 1/72448; H04M 1/72469

See application file for complete search history.

(56) References Cited

U.S. PATENT DOCUMENTS

| | | | |
|---|---|---|---|
| 10,936,100 | B2* | 3/2021 | Park .................... G06F 1/1677 |
| 2013/0058063 | A1* | 3/2013 | O'Brien ................ G06F 1/1624 |
| | | | 361/807 |
| 2014/0325433 | A1* | 10/2014 | Hiroura ................ G06F 3/0488 |
| | | | 715/789 |
| 2014/0372919 | A1 | 12/2014 | Fan et al. |
| 2016/0162161 | A1* | 6/2016 | Xue ..................... G06F 3/04817 |
| | | | 715/800 |
| 2017/0140504 | A1 | 5/2017 | Jeong et al. |
| 2018/0081398 | A1* | 3/2018 | Shin ....................... G09G 5/005 |
| 2018/0374452 | A1* | 12/2018 | Choi .................. G06F 3/04886 |
| 2019/0377459 | A1* | 12/2019 | Jeong .................... G06F 3/0481 |
| 2022/0291818 | A1* | 9/2022 | Lee ...................... G06F 3/04845 |
| 2022/0308753 | A1* | 9/2022 | Song .................... G06F 3/0481 |

FOREIGN PATENT DOCUMENTS

| | | |
|---|---|---|
| KR | 10-2014-0073381 | 6/2014 |
| KR | 10-2014-0147497 | 12/2014 |
| KR | 10-2016-0139643 | 12/2016 |
| KR | 10-2017-0024942 | 3/2017 |
| KR | 10-2017-0060519 | 6/2017 |
| KR | 10-2019-0001389 | 1/2019 |

OTHER PUBLICATIONS

European Patent Office Application Serial No. 19958265.1, Search Report dated Sep. 20, 2023, 10 pages.
Korean Intellectual Property Office Application No. 10-2022-7016787, Notice of Allowance dated Feb. 28, 2024, 8 pages.

* cited by examiner

FIG. 3
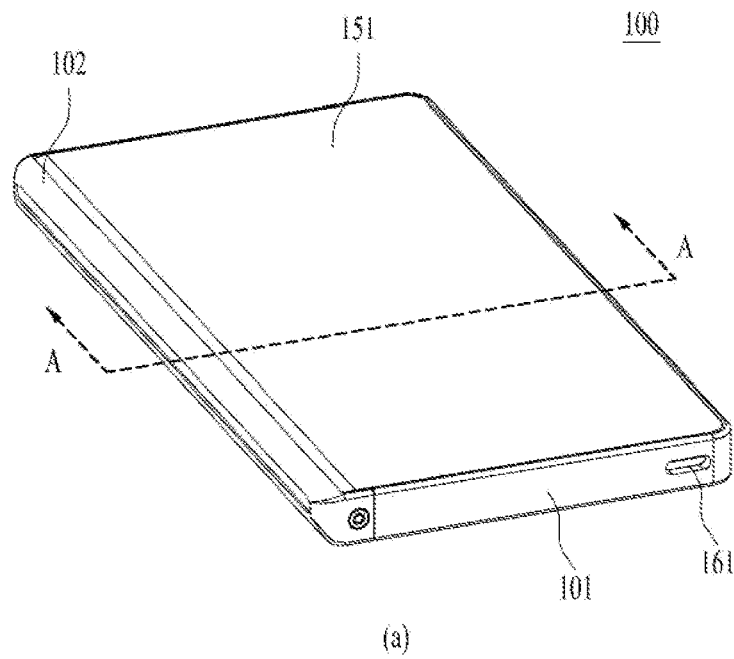
(a)
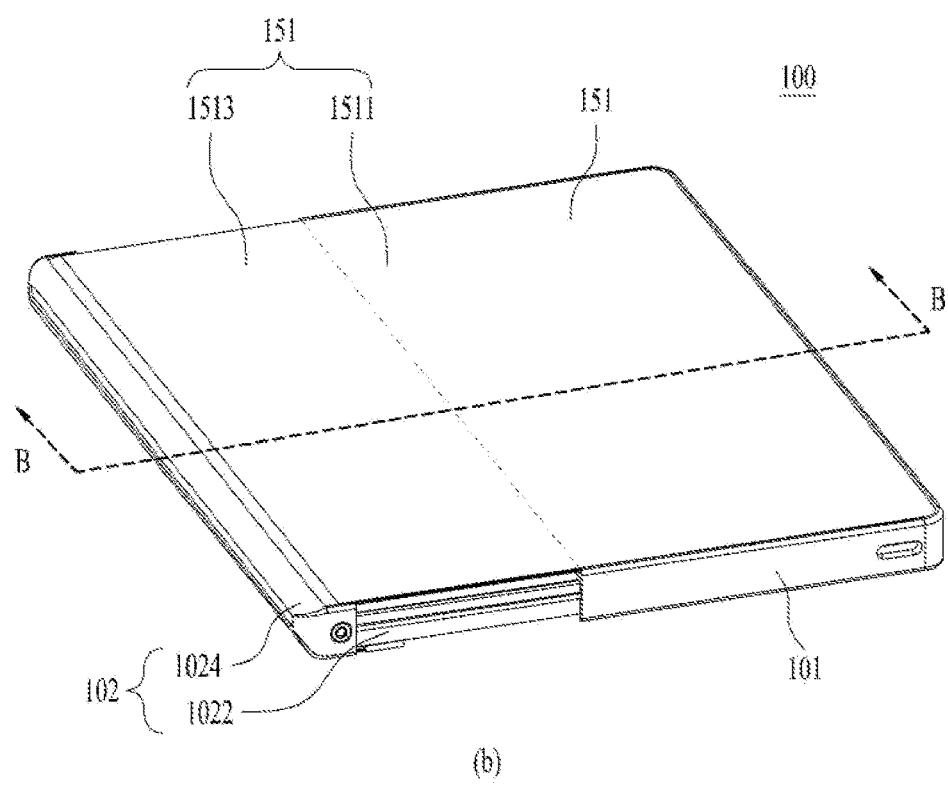
(b)

FIG. 4
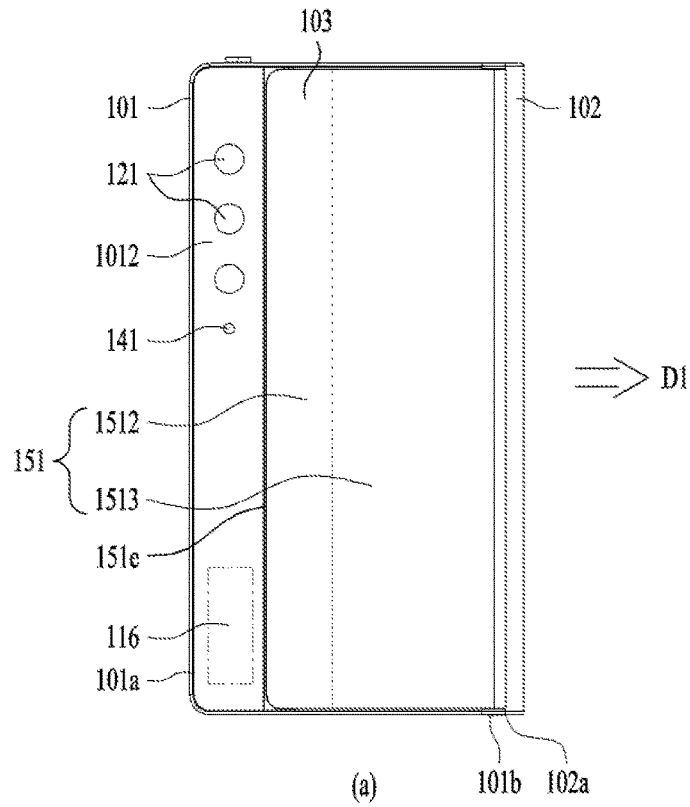
(a)
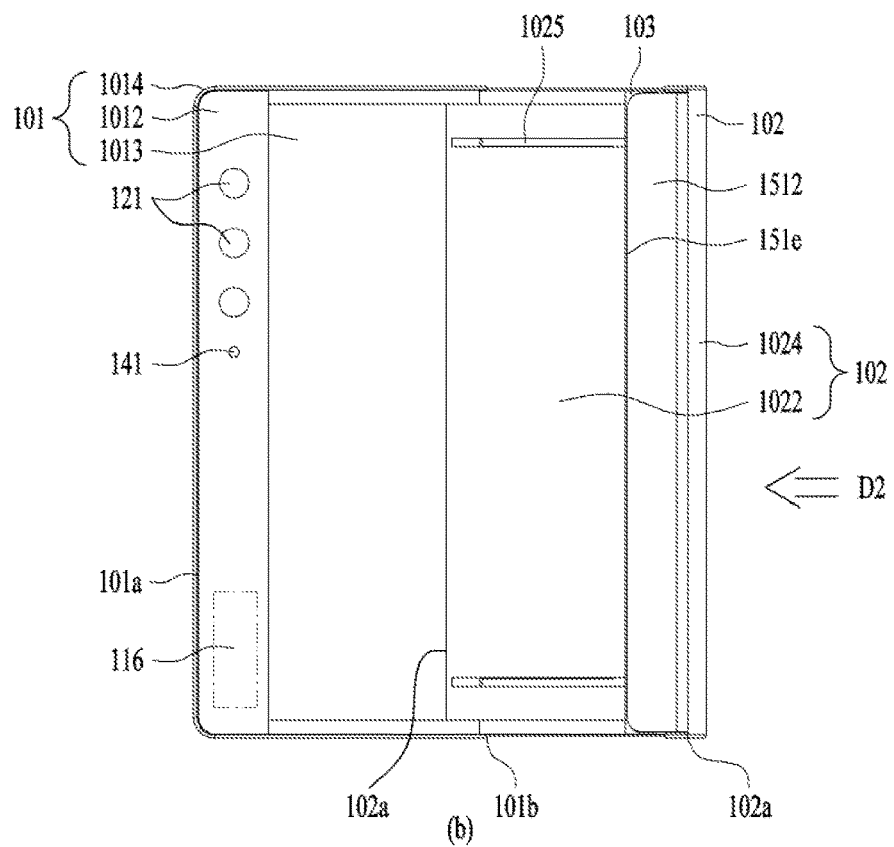
(b)

(a)  (b)

FIG. 14
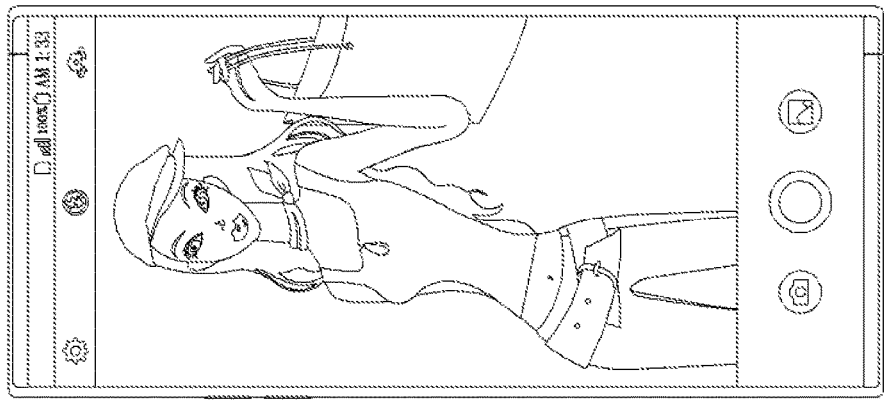
(14-3)
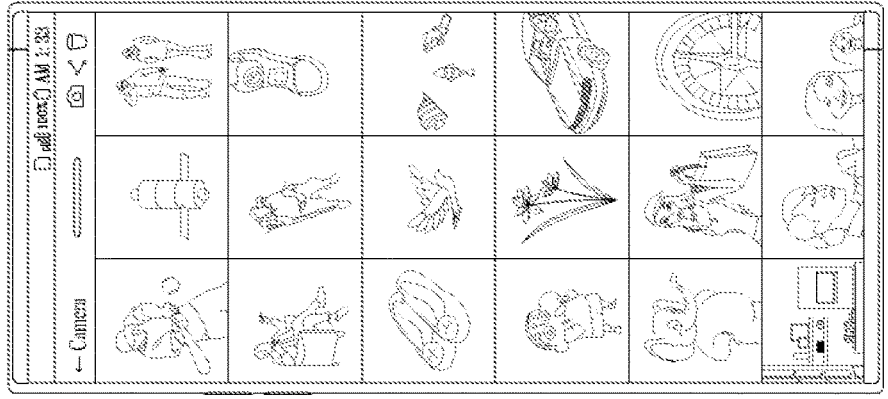
(14-2)
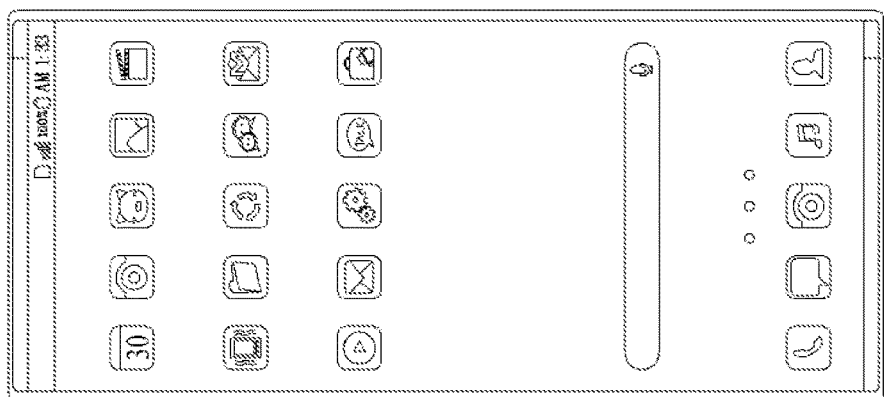
(14-1)

FIG. 20
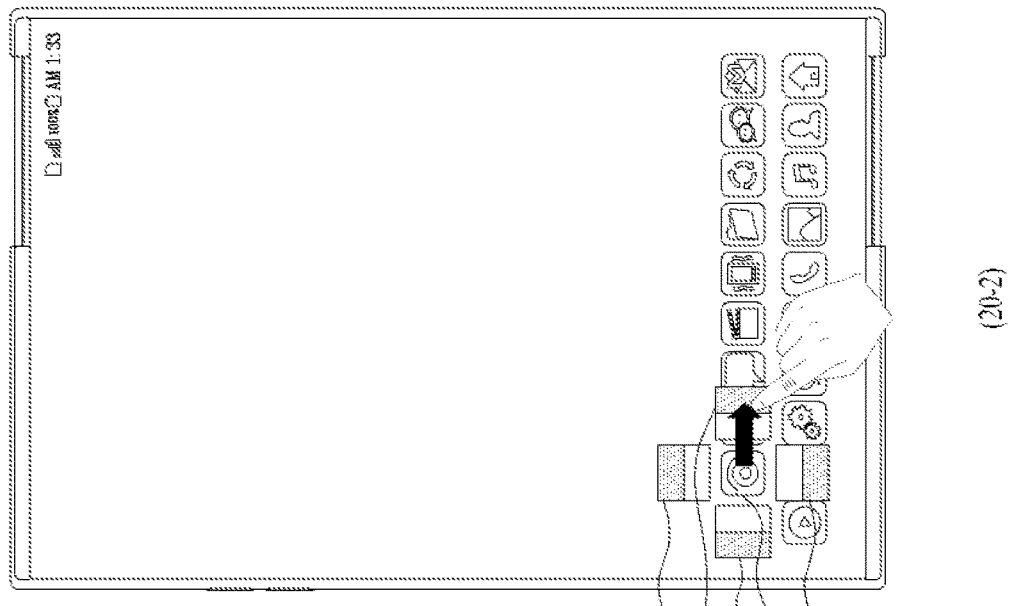
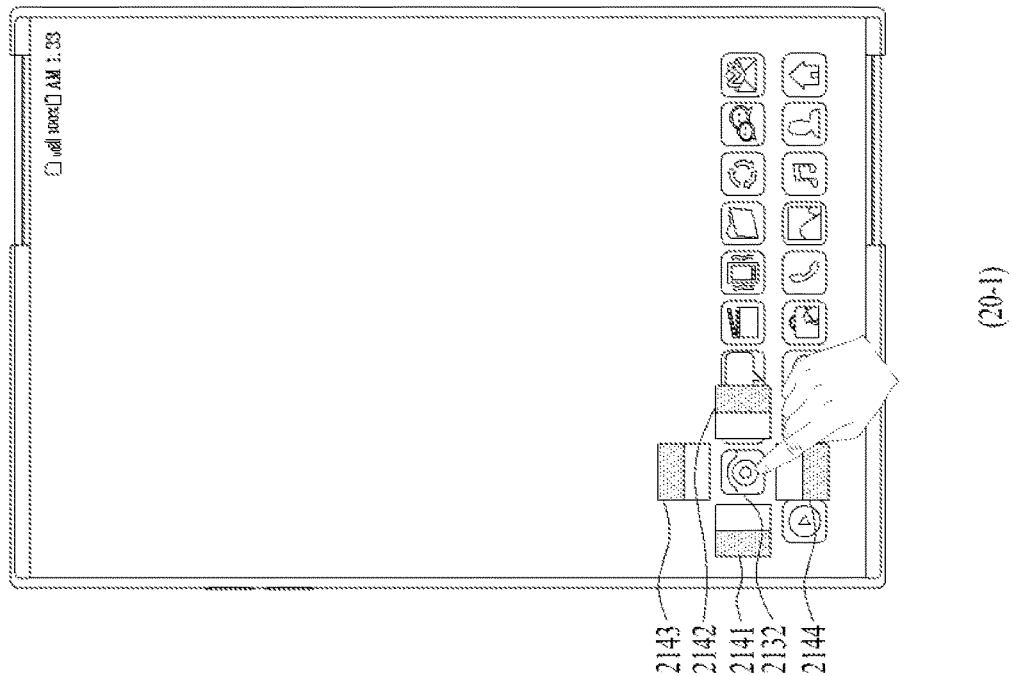

FIG. 24
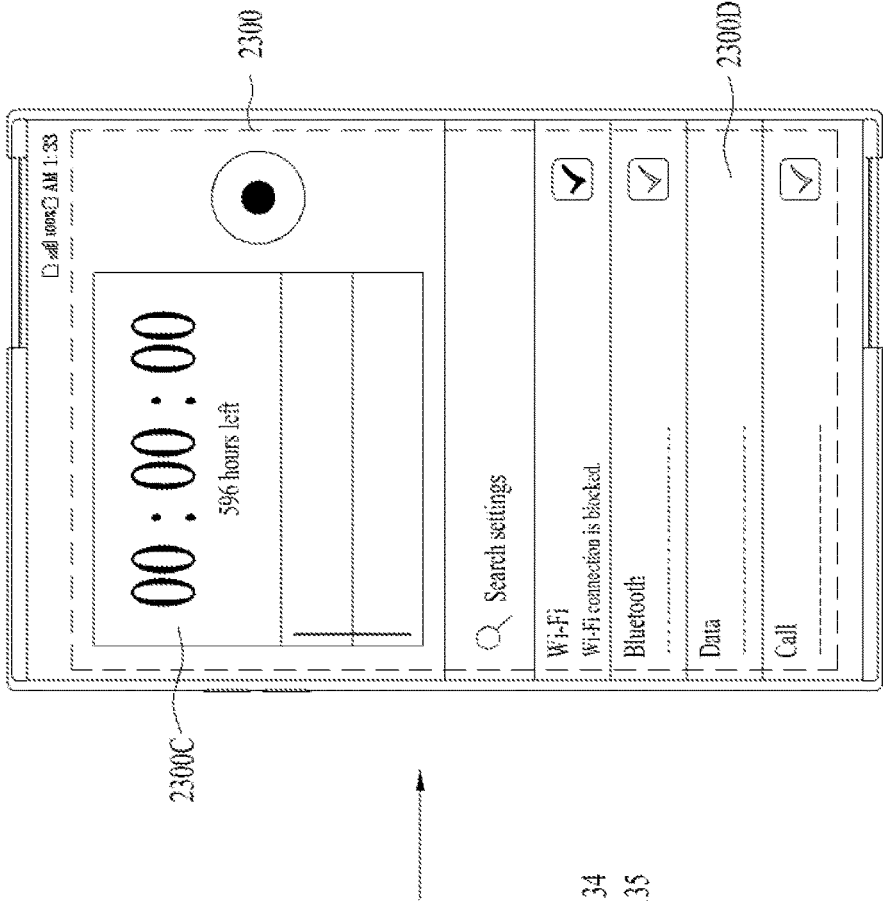
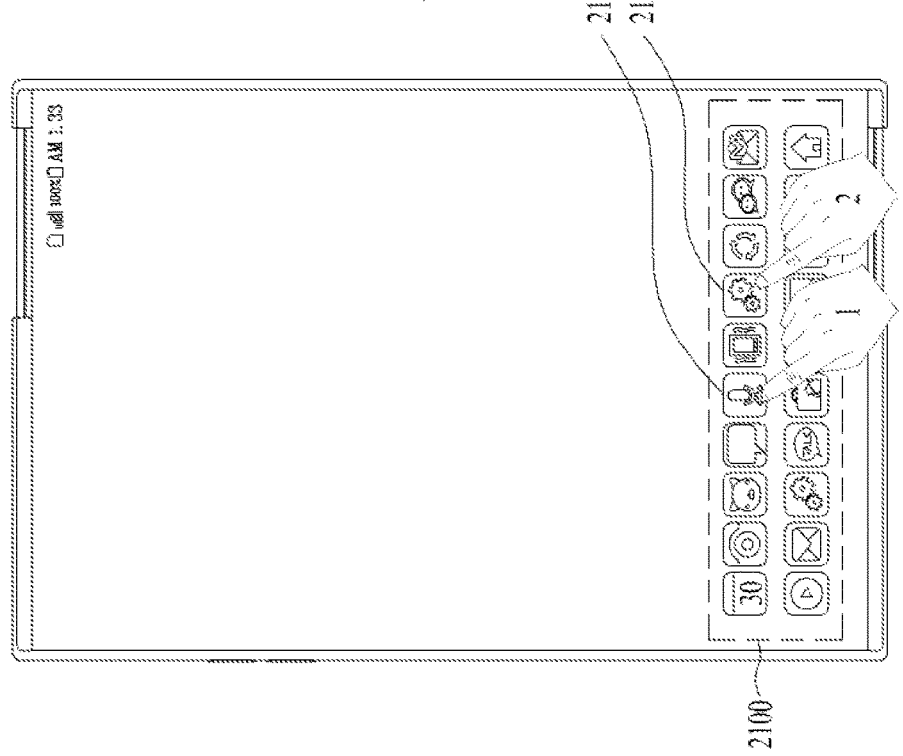

MOBILE TERMINAL HAVING A DISPLAY THAT ENLARGERS A FRONT DISPLAY REGION IN RESPONSE TO BEING SWITCHED TO AN EXTENDED DISPLAY MODE

CROSS-REFERENCE TO RELATED APPLICATIONS

This application is the National Stage filing under 35 U.S.C. 371 of International Application No. PCT/KR2019/018782, filed on Dec. 31, 2019, the contents of which is hereby incorporated by reference herein in its entirety.

TECHNICAL FIELD

The present disclosure relates to a mobile terminal, and relates to a mobile terminal having a flexible display whose size is able to be changed and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Recently, a flexible display that can be greatly deformed with sufficient elasticity has been developed. The display of the mobile terminal can be changed in size owing to the deformability of the flexible display.

On the other hand, recent mobile terminals can perform multitasking in which two or more applications can be simultaneously executed. As multitasking is executed, execution screens of two or more applications can be displayed together on the display of the mobile terminal.

DISCLOSURE

Technical Task

One technical task of the present disclosure is to provide a mobile terminal and control method thereof, by which a user may conveniently determine execution screens of two or more applications to be displayed by multitasking and a layout for them.

Technical Solutions

In one technical aspect of the present disclosure, provided is a mobile terminal including a body, a display coupled to the body to vary a display region visible from a front side of the body based on switching between an extended display mode and a contracted display mode, and a controller controlling a plurality of layout indicators for a plurality of application execution screens or a plurality of application indicators to be displayed in response to the switching from the contracted display mode to the extended display mode.

The body may include a first frame and a second frame configured extendable from the first frame and coupled to the first frame in a manner of being retractable into the first frame. The display may include a flexible display capable of enclosing the front side, lateral side and rear side of the body. The mobile terminal may operate in the extended display mode based on extending the second frame or operate in the contracted display mode based on contracting the second frame.

In one technical aspect of the present disclosure, provided is a method of controlling a mobile terminal having a body and a display coupled to the body to vary a display region visible from a front side of the body based on witching between an extended display mode and a contracted display mode, the method including switching from the contracted display mode to the extended display moue and controlling a plurality of layout indicators for a plurality of application execution screens or a plurality of application indicators to be displayed.

Advantageous Effects

Effects of a mobile terminal and control method thereof according to the present disclosure are described as follows.

According to at least one of embodiments of the present disclosure, it is advantageous in that a user may conveniently determine execution screens of two or more applications to be displayed by multitasking and a layout for them.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this Detailed Description.

DESCRIPTION OF DRAWINGS

FIG. 3 shows perspective views respectively illustrating a first state and a second state viewed from one side of a mobile terminal according to one embodiment.

FIG. 4 shows rear face views respectively illustrating a first state and a second state of a mobile terminal according to one embodiment.

FIG. 14 shows a front display region when a contracted display mode is restored from an extended display mode according to one embodiment of the present disclosure.

FIGS. 20 to 22 show a front display region in an extended display mode according to one embodiment of the present disclosure.

FIG. 23 and FIG. 24 show a front display region in an extended display mode according to one embodiment of the present disclosure.

BEST MODE FOR DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
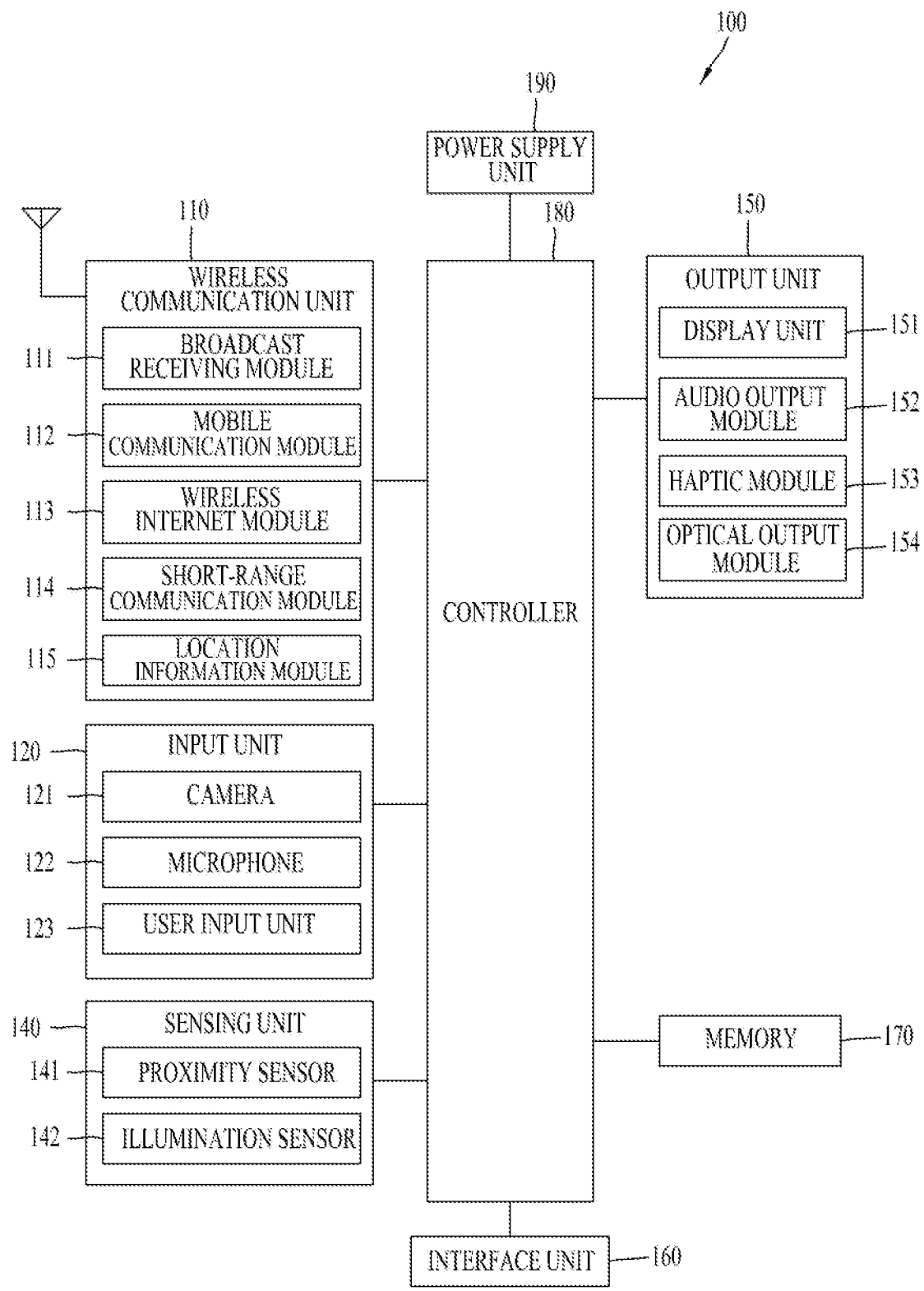
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by the controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
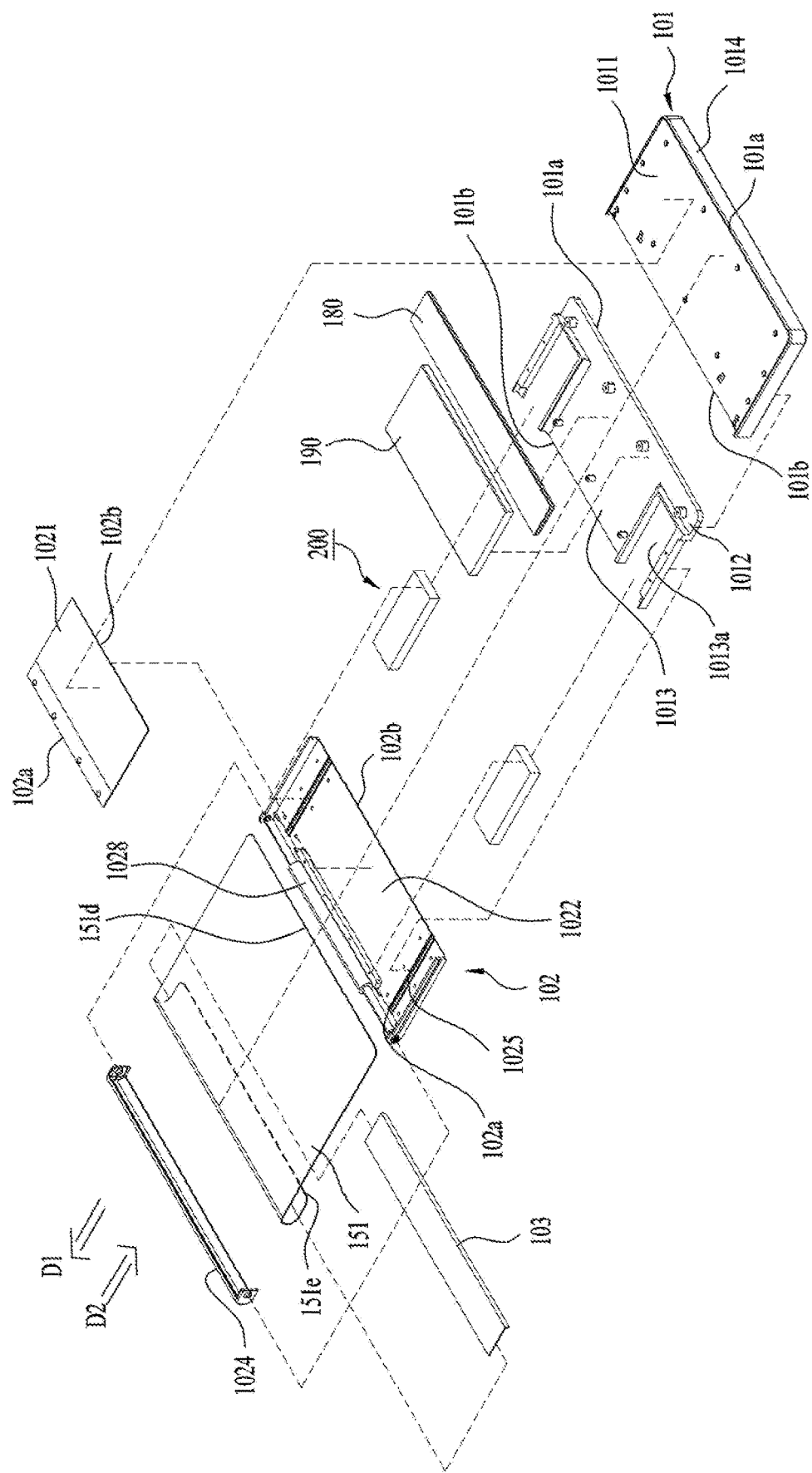
FIG. 2 is an exploded perspective view of a mobile terminal according to one embodiment.
Figure 5:
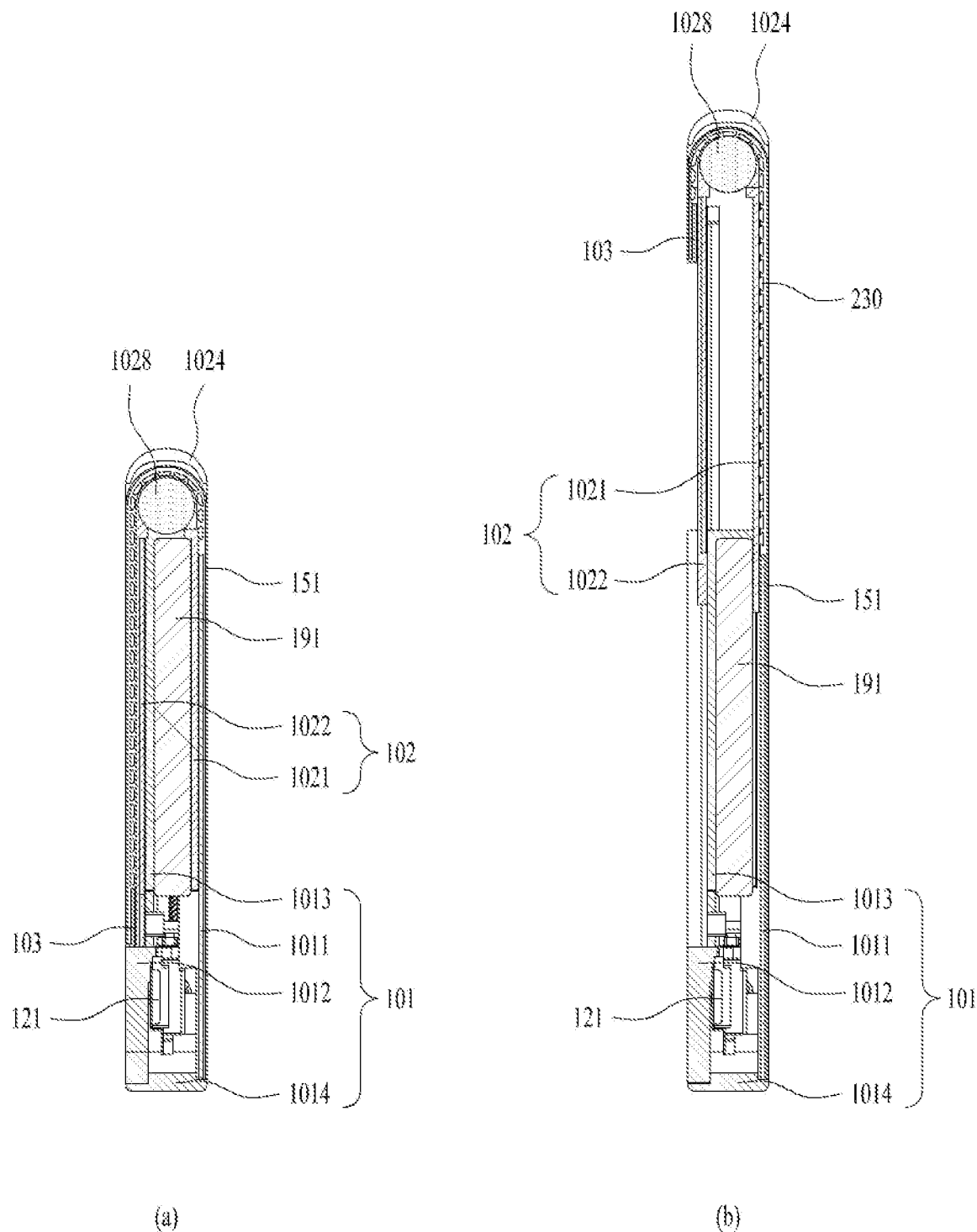
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3 (*a*), 4 (*a*), and 5 (*a*) show a first state of the mobile terminal, and FIGS. 3 (*b*), 4 (*b*), and 5 (*b*) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3 (*a*) into the second state as shown in FIG. 3 (*b*) by enlarging a screen thereof. In the second state, an area of the front face of the display unit 151 is enlarged, and an area of a rear face of the display unit 151 is reduced as shown in FIG. 4 (*b*). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, e.g., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to be described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit 151. On the other hand, an additional auxiliary camera is required to be disposed on the front face of the terminal in order for the user to capture himself or herself while viewing himself or herself through the display unit 151.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit 151, but may be disposed on the front face of the display unit 151 using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and should not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension should be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (e.g., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

Because the side face is rolled by the roller, the side face is bent with the predetermined curvature, and an inner face of the side frame may include a curved face corresponding to the curvature of the side face.

The first region and the second region correspond to the fixed portion described above. The third region corresponds to the variable portion described above, and may vary in position depending on the state of the mobile terminal. Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101.

On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (e.g., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 should move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. The first region and the second region corresponds to the fixed portion described above, and the third region corresponds to the variable portion described above Such configuration of the display unit 151 will be described in more detail below. The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4 (b), the slot 1025 extending in the lateral direction (e.g., the direction perpendicular to the longitudinal direction of the mobile terminal 100) to the second frame 102, that is, to the third rear portion 1022 is defined. Further, the third frame 103 may move along the slot 1025. In FIG. 4 (b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4 (b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

Hereinafter, an embodiment in which two or more application execution screens are displayed together in a mobile terminal, as described above, will be described with reference to FIGS. 6 to 27.

Hereinafter, the term "extended (or enlarged) display mode" may refer to a mode in which a mobile terminal displays a lock screen, a home screen, or a content (e.g., an application execution screen) while a second frame is extended from a first frame.

Hereinafter, the term "contracted (or retracted) display mode" may refer to a mode in which the mobile terminal displays a lock screen, a home screen, or a content (e.g., an application execution screen) while the second frame is contracted toward the first frame.

Hereinafter, the term "front display region" in the extended display mode may refer to a region including the first region 1511 and the third region 1513, as described above, when the mobile terminal is in the extended display mode.

Hereinafter, the term "front display region" in the contracted display mode may refer to a region including the first region 1511 when the mobile terminal is in the contracted display mode.

That is, the front display region in the extended display mode may be wider than the front display region in the contracted display mode.

As described above with reference to FIGS. 2 to 5, an embodiment of the present disclosure in which two or more application execution screens are displayed together according to the extended display mode or the contracted display mode should not be applied only to the mobile terminal in which the first frame and the second frame are coupled together. For example, if a display region is configured to be variable like a foldable form factor, a slidable form factor, a rollable form factor and the like, it may be applicable to all types of mobile terminals.

Figure 6:
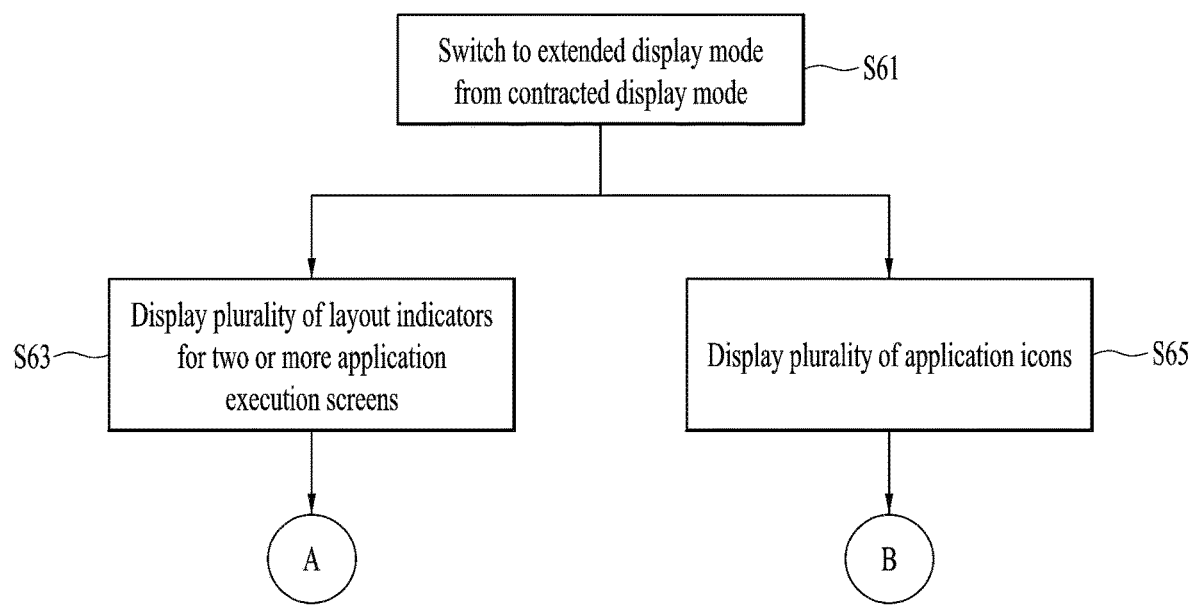
FIG. 6 is a flowchart of layout configuration of two or more application execution screens displayed according to an embodiment of the present disclosure.

Hereinafter, layout configuration of two or more application execution screens displayed according to an embodiment of the present disclosure will be described with reference to FIG. 6. FIG. 6 is a flowchart of layout configuration of two or more application execution screens displayed according to an embodiment of the present disclosure.

The mobile terminal 100 may switch from the contracted display mode to the extended display mode [S61]. The switching from the extended display mode to the contracted display mode may be performed by a user's touch input performed on the display or a user's separate hardware button manipulation, by an external force applied to the mobile terminal 100 by the user, or by an occurrence of a preset event (e.g., phone call reception, message reception, etc.) in no relation to the manual manipulation.

When the mobile terminal 100 switches from the contracted display mode to the extended display mode, the controller 180 may control a plurality of layout indicators, which are provided to configure a display layout of two or more application execution screens, to be displayed on the front display region [S63].

Alternatively, when the mobile terminal 100 switches from the contracted display mode to the extended display mode, the controller 180 may control a plurality of application icons, which are provided to select two or more application execution screens to display, to be displayed on the front display region [S65].

Figure 7:
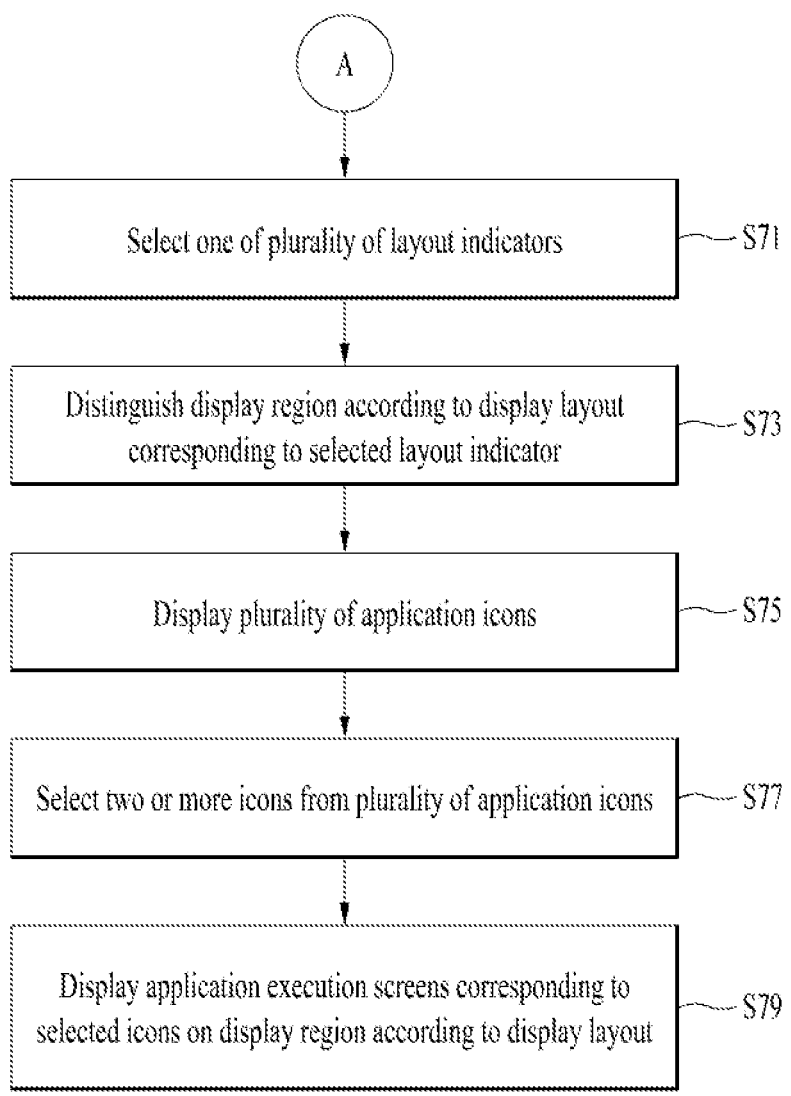
FIG. 7 is an additional flowchart of layout configuration of two or more application execution screens through a plurality of layout indicators according to one embodiment of the present disclosure.
Figure 8:
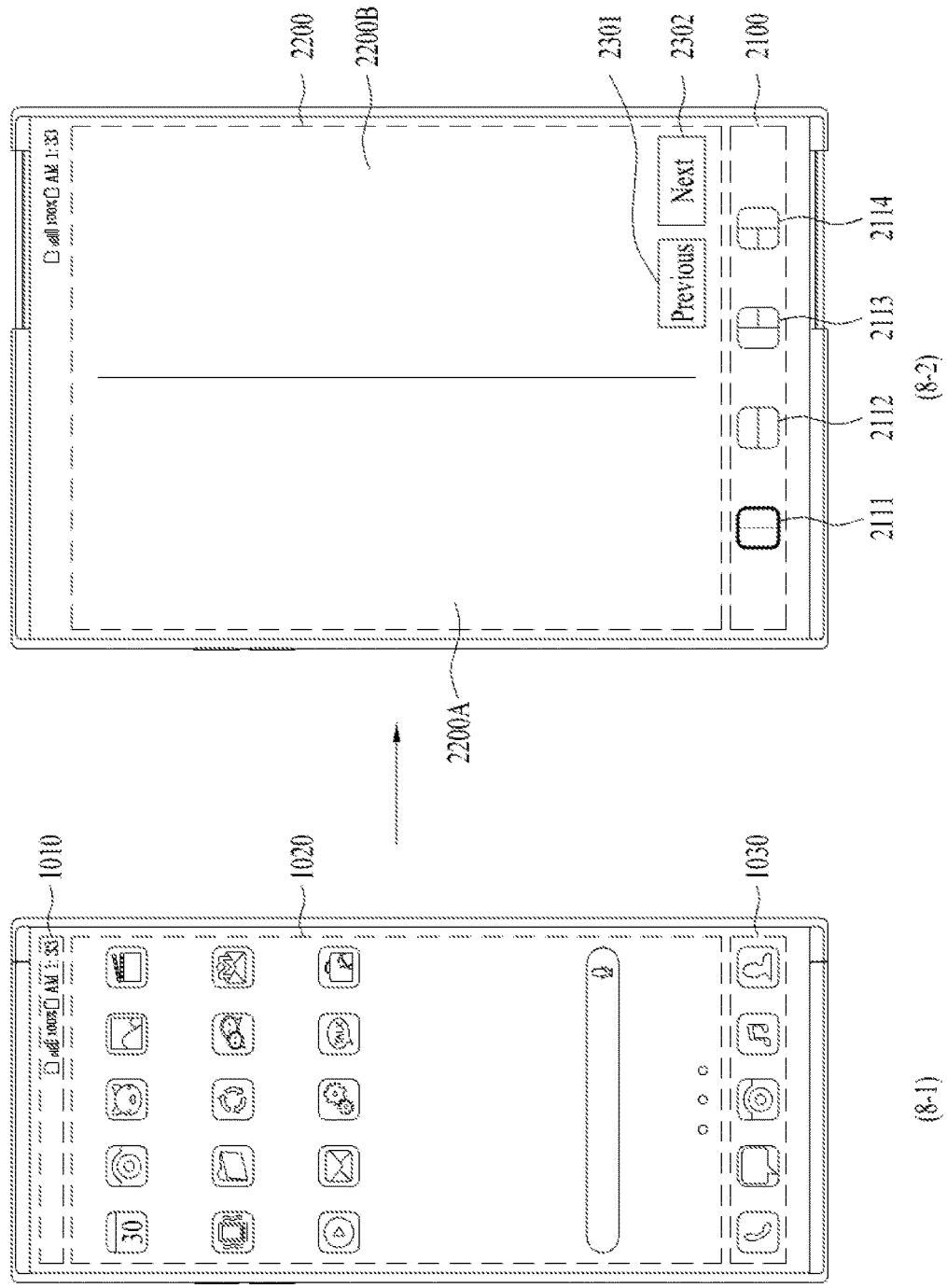
FIG. 8 shows a front display region when a contracted display mode is switched to an extended display mode according to one embodiment of the present disclosure.

Hereinafter, with reference to FIGS. 7 to 14, configuring the layout of the two or more application execution screens through a plurality of the displayed layout indicators will be described in more detail. FIG. 7 is an additional flowchart of layout configuration of two or more application execution screens through a plurality of layout indicators according to one embodiment of the present disclosure. FIG. 8 shows a front display region when a contracted display mode is switched to an extended display mode according to one embodiment of the present disclosure. FIGS. 9 to 13 show a front display region in an extended display mode according to one embodiment of the present disclosure. FIG. 14 shows a front display region when a contracted display mode is restored from an extended display mode according to one embodiment of the present disclosure.

As shown in FIG. 8 (8-1), the mobile terminal 100 may display a home screen in the contracted display mode. The home screen may refer to a screen displayed on a foreground in a state in which no application is executed when the mobile terminal is released from a locked state. A multitude of application icons (and/or widgets) preconfigured by a user may be displayed on the home screen. A plurality of the preconfigured application icons may be divided and grouped to form a plurality of pages, and may be displayed in a manner of being switched by one page each time a preconfigured touch gesture is performed on the front display region.

When the home screen is displayed, indicators (e.g., a mobile communication signal strength indicator, a Wi-Fi signal strength indicator, a charge amount indicator, etc.) may be displayed on a top end region 1010 (e.g., a status bar) of the front display region in the contracted display mode.

In addition, application icons configuring one of a plurality of the pages of the home screen may be displayed on a middle region 1020 of the front display region in the contracted display mode.

Besides, in the contracted display mode, icons of preconfigured applications particularly frequently used by a user may be displayed on a bottom end region 1030 (e.g., a dock bar) of the front display region.

When the home screen is being displayed, as described above, the mobile terminal 100 may switch from the contracted display mode to the extended display mode [S61].

Then, as shown in FIG. 8 (8-2), the controller 180 may control a plurality of layout indicators 2111, 2112, 2113, and 2114, which are provided to configure a display layout of two or more application execution screens, to be displayed on a first region 2100 of the front display region [S63]. Here, the first indicator 2111 and the second indicator 2112 relate to a layout for simultaneously displaying two application execution screens, and the third indicator 2113 and the fourth indicator 2114 relate to a layout for simultaneously displaying three application execution screens. Of course, an indicator related to a layout for simultaneously displaying four or more application execution screens may also be displayed. Here, regarding "simultaneously", the display of the two or more application execution screens does not necessarily have to start at the same time point, and it is sufficient that the two or more application execution screens are displayed together at a random time point.

When a plurality of the layout indicators 2111, 2112, 2113, and 2114 are displayed, the first indicator 2111 may be pre-selected as a default [S71].

Accordingly, as shown in FIG. 8 (8-2), the controller 180 may control the second region 2200 of the front display region to be divided according to a display layout by the selected first indicator 2111 [S73]. That is, the second region 2200 may be divided into a left region 2200A and a right region 2200B according to the display layout by the selected first indicator 2111. As illustrated in FIG. 8 (8-2), the second region 2200 is displayed in a manner of being divided into the left region 2200A and the right region 2200B so as to guide a user in advance that two application execution screens will be displayed in a manner of corresponding to the left region 2200A and the right region 2200B according to the display layout by the first indicator 2111. When the first indicator 2111 is selected, the display layout according to the first indicator 2111 in the second region 2200 is not necessarily provided in advance. That is, the step S73 of FIG. 7 may be skippable.

Meanwhile, the controller 180 may control a previous icon 2301 and a next icon 2302 to be displayed on the front display region. These two icons 2301 and 2302 may be displayed anywhere in the front display region, but in FIG. 8 (8-2), they are illustrated as displayed at a right bottom end position of the first region. The previous icon 2301 is for returning to a previous step, and the next icon 2302 is for proceeding to a next step. These two icons 2301 and 2302 do not necessarily have to be displayed, and may not be displayed.

In some implementations, it is not necessary for the first region 2100 (or the first region 2100) and the second region 2200, as shown in FIG. 8 (8-2), to be displayed when the mobile terminal 100 switches from the contracted display mode to the extended display mode only while the home screen is displayed. For example, the first region 2100 (or the first region 2100) and the second region 2200, as shown in FIG. 8 (8-2) may be displayed even if the mobile terminal 100 switches from the contracted display mode to the extended display mode while a lock screen or an Always On Display (AOD) screen is displayed.

Here, the lock screen may refer to a screen displayed to enable only a minimum range of user manipulations (for example, unlocking) in order to prevent a mobile terminal from malfunctioning due to user's careless manipulation. In general, a screen, which is displayed when the mobile terminal switches from a sleep mode to an active mode, may correspond to the lock screen.

In addition, the AOD screen may refer to a screen in which as the mobile terminal is in the sleep mode, a partial region is turned off in the front display region and prescribed information (e.g., a current time, etc.) is displayed on the rest of the region.

Figure 9:
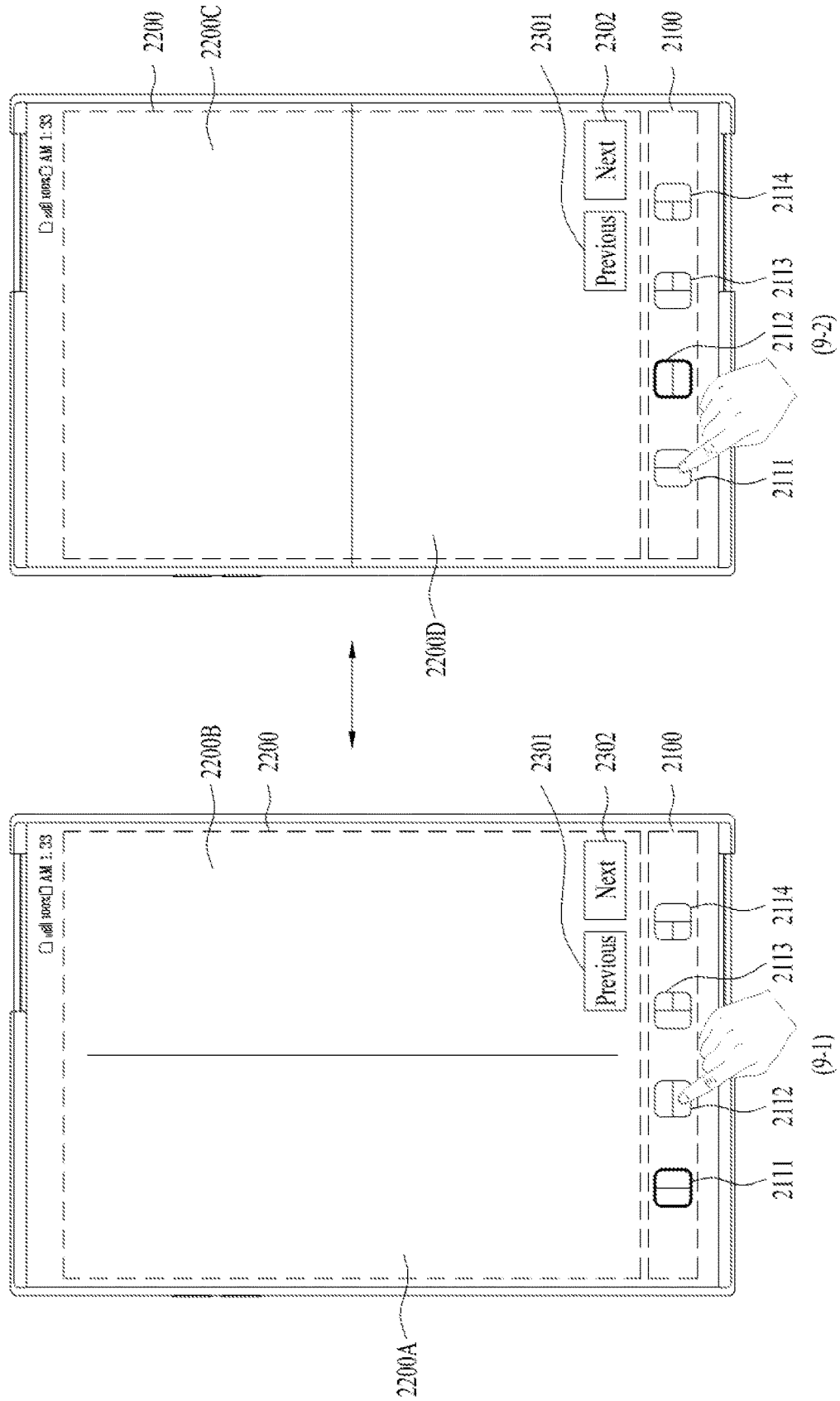
FIGS. 9 to 13 show a front display region in an extended display mode according to one embodiment of the present disclosure.

Meanwhile, as shown in FIG. 9 (9-1), when the display layout according to the first indicator 2111 is provided in the second region 2200, the second indicator 2112 may be touched and selected from a plurality of the layout indicators 2111, 2112, 2113, and 2114 [S71].

Then, as shown in FIG. 9 (9-2), similarly to the above-described description, the controller 180 may control the second region 2200 of the front display region to be divided according to the display layout by the selected second indicator 212 [S73]. Namely, the second region 2200 may be divided into a top region 2200C and a bottom region 2200D according to the display layout by the selected second indicator 2112. As shown in FIG. 9 (9-2), the second region 2200 is displayed by being divided into the top region 2200C and the lower region 2200D so as to guide a user in advance that two application execution screens will be displayed in a manner of corresponding to the top region 2200C and the bottom region 2200D according to the display layout by the second indicator 2112. In addition, since the contents described in FIG. 8 (8-2) are applicable to FIG. 9 (9-2) as they are or similarly, the details will be omitted for simplicity of the present specification.

When the display layout according to the second indicator 2112 is displayed, the second indicator 2112 is touched and selected again, whereby it is a matter of course that the mobile terminal 100 may return to the state of FIG. 8 (8-2) or FIG. 9 (9-1).

In the state of FIG. 8 (8-2) or FIG. 9 (9-1), a user command to proceed to a next step may be inputted. The user command may be inputted in a manner of the next icon 2302 is touched for example.

Figure 10:
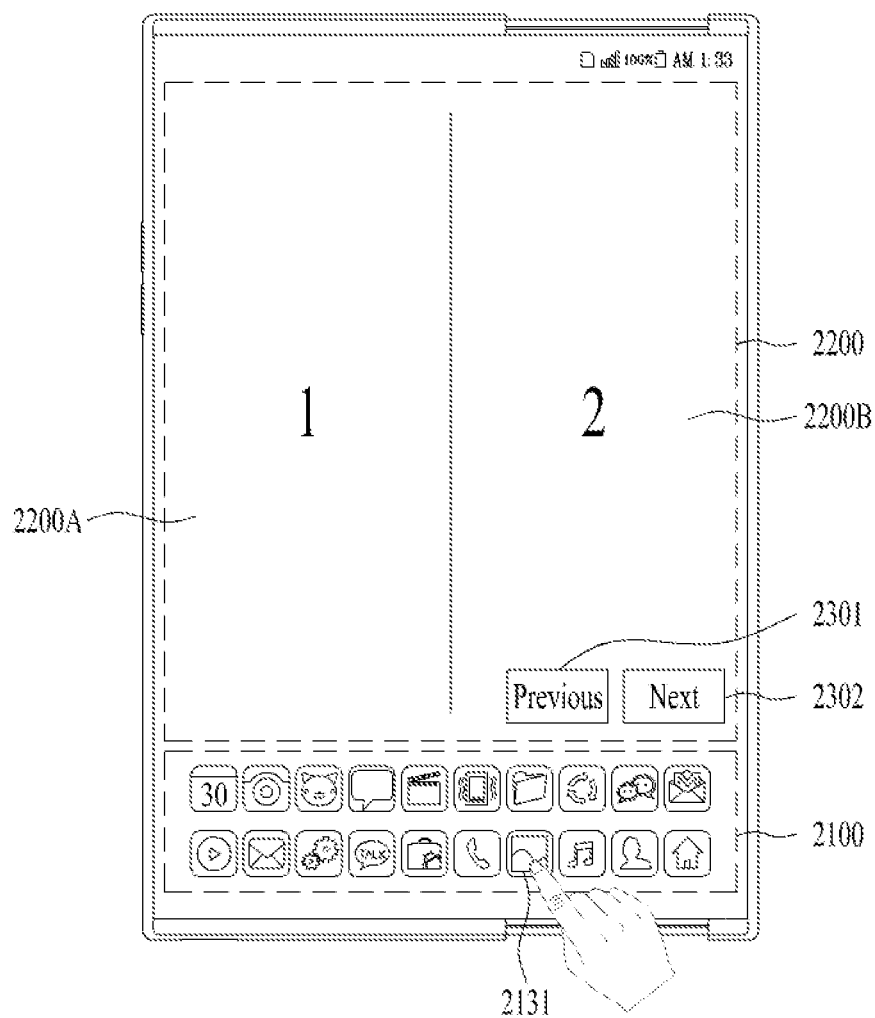

Then, as shown in FIG. 10, the controller 180 may control a plurality of application icons to be displayed on the first region 2100 of the front display region [S75]. When a plurality of the application icons are displayed on the first region 2100, a plurality of the indicators may be no longer displayed. The left region 2200A and the right region 2200B may be denoted by '1' and '2', respectively. As described below, this is to guide a user that when two icons are selected sequentially from a plurality of the application icons, an application execution screen of a first selected icon will be displayed on the left region 2200A and an application execution screen of a second selected icon will be displayed on the right region 2200B. The '1' and '2' may not be displayed on the left region 2200A and the right region 2200B.

A plurality of the application icons may be the same as or at least some different application icons displayed on the home screen. For example, a plurality of the application icons may include icons corresponding to applications within a predetermined rank frequently used by a user during a prescribed period among applications installed on the mobile terminal. Alternatively, a plurality of the application icons may include icons corresponding to applications previously selected by a user among applications installed on the mobile terminal.

Among a plurality of the application icons, icons amounting to the number of application execution screens simultaneously displayable according to the display layout by the selected first indicator 2111 may be [S77]. For example, since the number of application execution screens simultaneously displayable according to the display layout corresponding to the selected first indicator 2111 is two, two icons may be selected from a plurality of the application icons.

Accordingly, as shown in FIG. 10, a first application icon 2131 (e.g., a gallery application icon) may be touched and selected from a plurality of the application icons.

Figure 11:
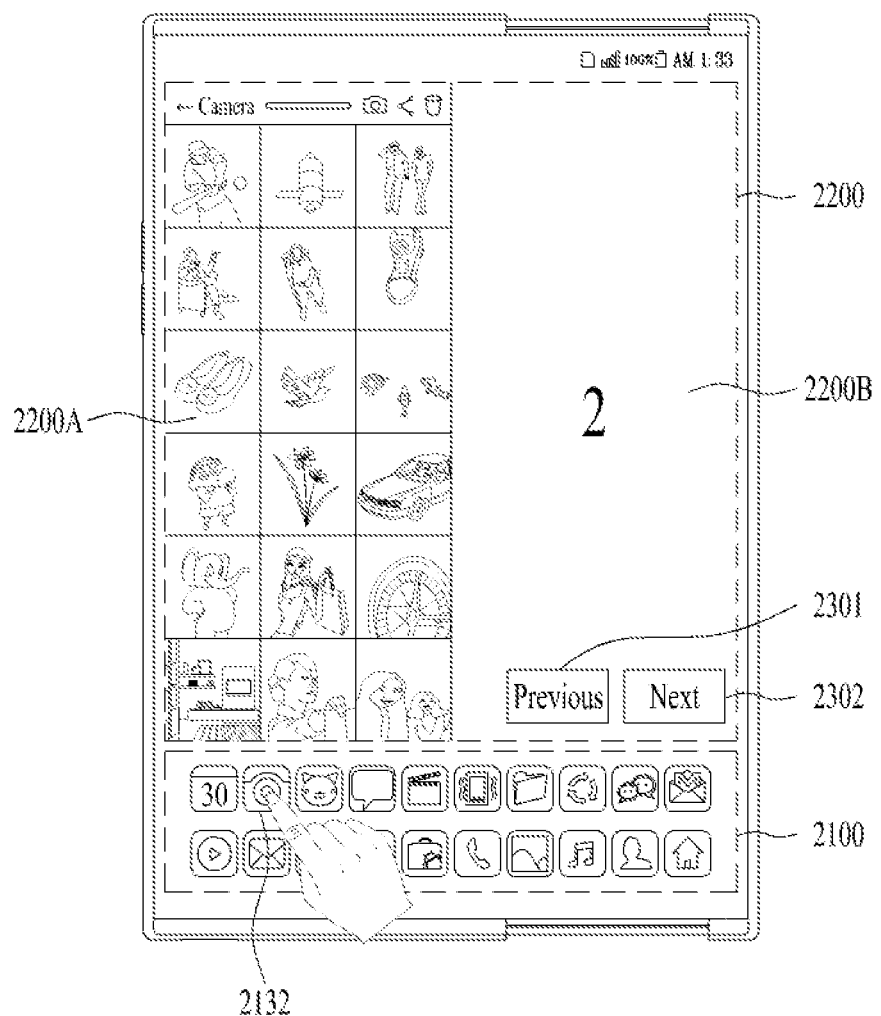

Then, as shown in FIG. 11, the controller 180 may display a first application execution screen corresponding to the first application icon on the left region 2200A [S79].

Next, as shown in FIG. 11, a second application icon 2132 (e.g., a camera application icon) may be touched and selected from a plurality of the application icons.

Figure 12:
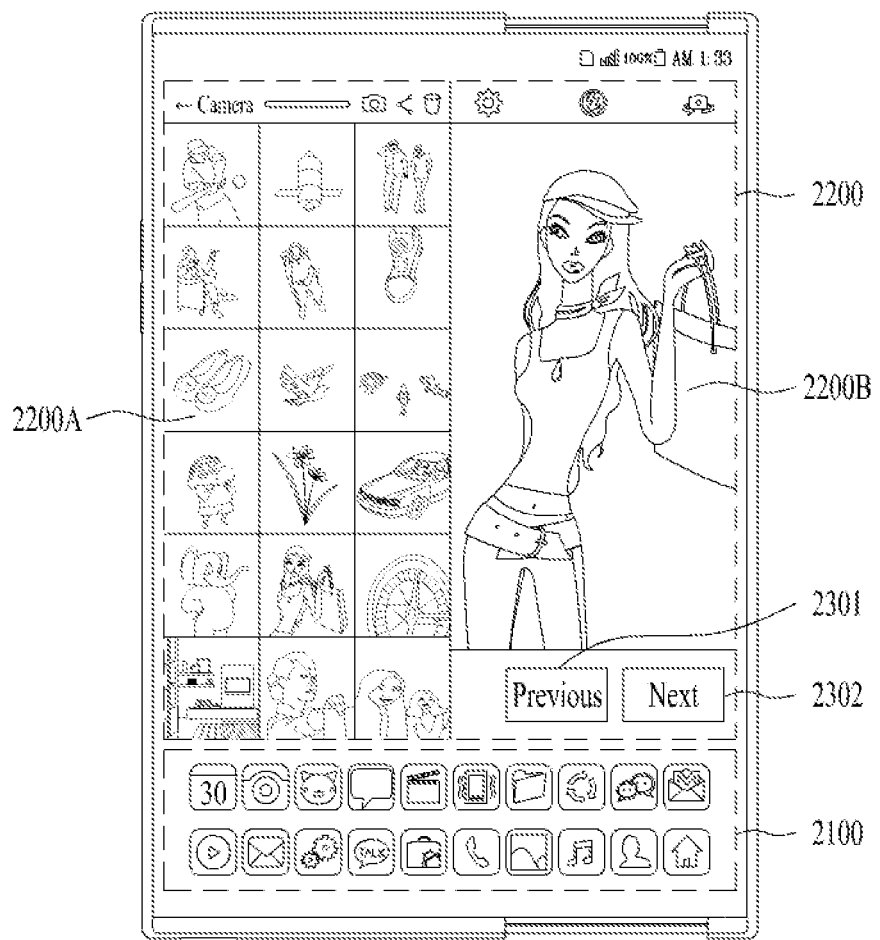

Then, as shown in FIG. 12, the controller 180 may display a second application execution screen corresponding to the second application icon 2132 on the right region 2200B [S79].

Next, a user command for proceeding to a next step may be inputted. The user command may be inputted, for example, by touching the next icon 2302.

Figure 13:
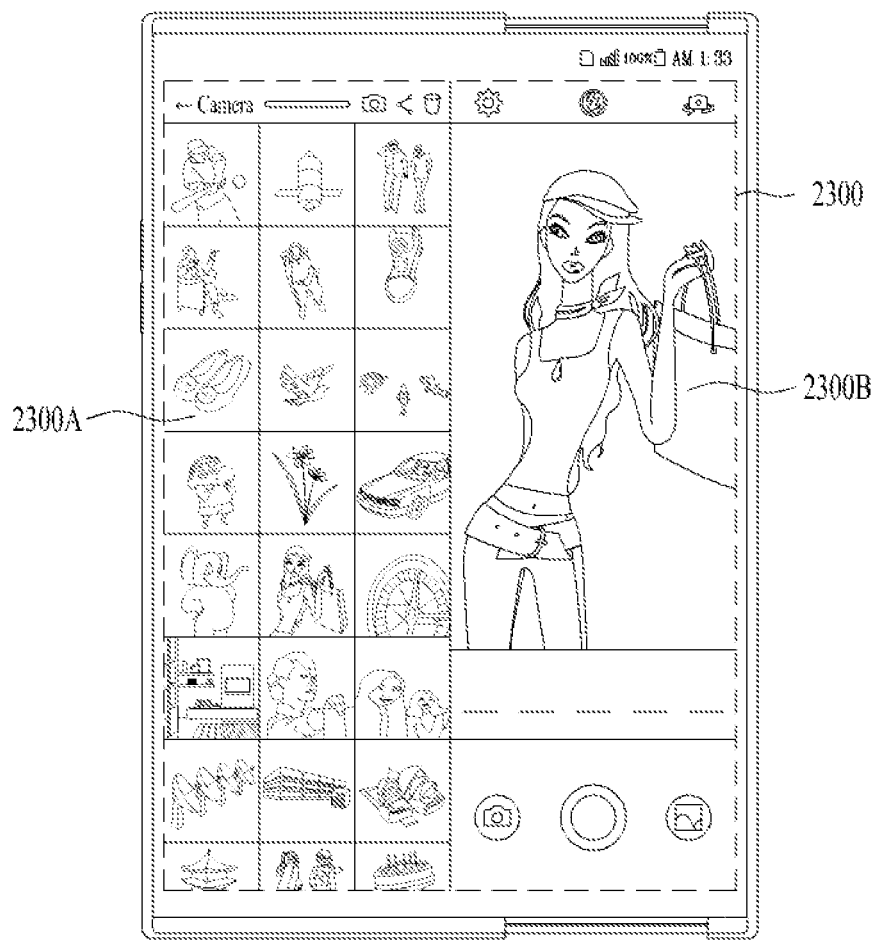

Then, as shown in FIG. 13, the controller 180 may control a plurality of the application icons, the previous icon 2301, and the next icon 2302 to disappear from the front display region. As shown in FIG. 13, the controller 180 may divide a third region 2300 including the first region 2100 and the second region 2200 into a new left region 2300A and a new right region 2300B according to the display layout corresponding to the first indicator 2111 and then control a first application execution screen and a second application execution screen to be displayed on the left region 2300A and the right region 2300B, respectively.

Accordingly, the first application execution screen and the second application execution screen may be simultaneously displayed on the mobile terminal 100 in a layout desired by a user in a multitasking manner.

In some implementations, when the mobile terminal 100 is in the state of FIG. 11, if a second application icon 2132 is touched and selected, the state of FIG. 12 may be skipped and immediately changed to the state of FIG. 13.

Meanwhile, the mobile terminal 100 may return from the extended display mode to the contracted display mode. The return from the extended display mode to the contracted display mode may be performed by a user's touch input performed on the display or a user's separate hardware button manipulation, by an external force applied to the mobile terminal 100 by the user, or by an occurrence of a preset event (e.g., phone call reception, message reception, etc.) in no relation to the manual manipulation.

When the mobile terminal 100 returns to the contracted display mode from the extended display mode, the controller 180 may display a screen displayed before switching to the extended display mode from the contracted display mode. Namely, when the home screen was being displayed on the front display region in the contracted display mode before switching to the extended display mode from the contracted display mode, as shown in FIG. 8 (8-1), if the mobile terminal returns from the extended display mode to the contracted display mode, as shown in FIG. 14 (14-1), the home screen may be displayed again on the front display region in the contracted display mode. Alternatively, although not shown, when the lock screen or the AOD screen was being displayed on the front display region in the contracted display mode before switching to the extended display mode from the contracted display mode, if the mobile terminal returns to the contracted display mode from the extended display mode, the lock screen or the AOD screen may be display again on the front display region in the contracted display mode.

Alternatively, if the mobile terminal 100 returns to the contracted display mode from the extended display mode, the controller 180 may control the first application execution screen to be display on the front display region in the contracted display mode [FIG. 14 (14-2)], or control the second application execution screen to be display on the front display region in the contracted display mode [FIG. 14 (14-3)].

In this way, the first application execution screen and the second application execution screen may stop being simultaneously displayed on the mobile terminal 100 in a multi-tasking manner.

According to the above description, when the home screen, the lock screen, or the AOD screen is displayed on the front display region in the contracted display mode, the mobile terminal switches from the contracted display mode to the extended display mode.

Figure 15:
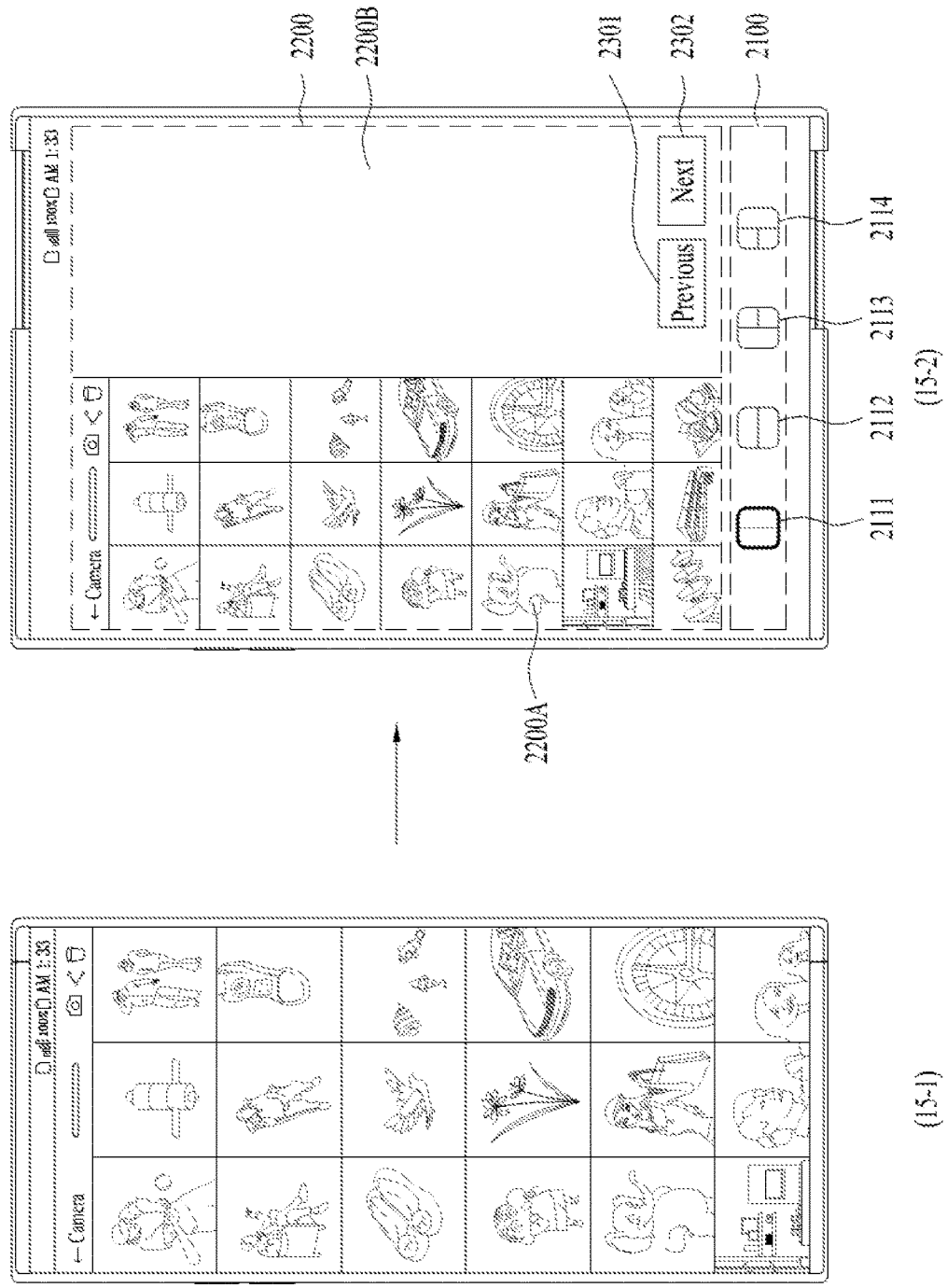
FIG. 15 shows a front display region when a contracted display mode is switched to an extended display mode according to one embodiment of the present disclosure.
Figure 16:
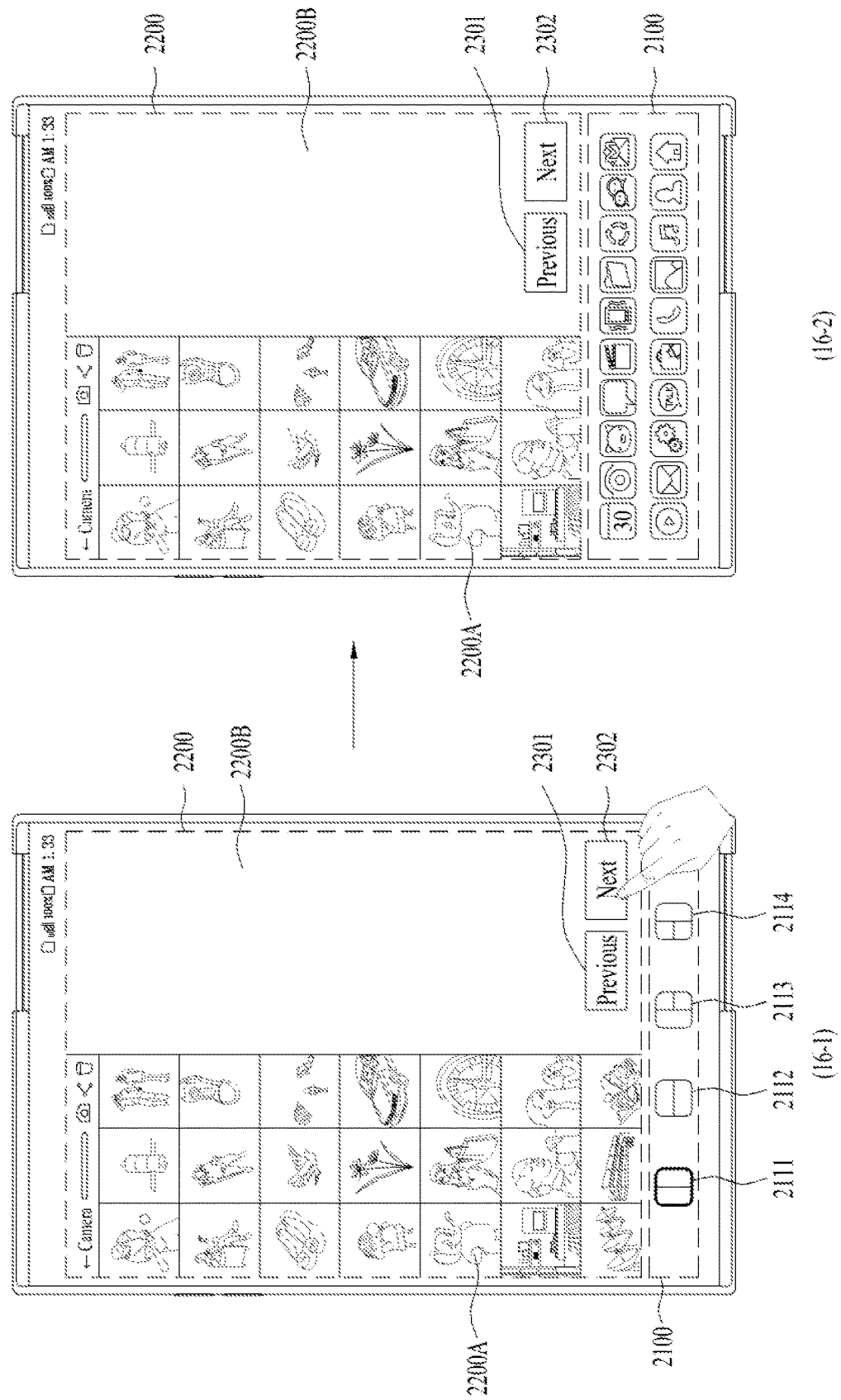
FIG. 16 shows a front display region in an extended display mode according to one embodiment of the present disclosure.

Hereinafter, when an execution screen of an application previously executed by a user is being displayed on the front display region in the contracted display mode, the mobile terminal switches from the contracted display mode to the extended display mode, which will be described with reference to FIG. 15 and FIG. 16. FIG. 15 shows a front display region when a contracted display mode is switched to an extended display mode according to one embodiment of the present disclosure. FIG. 16 shows a front display region in an extended display mode according to one embodiment of the present disclosure.

In this case, the mobile terminal 100 may switch from the contracted display mode to the extended display mode. As described above, the switching to the extended display mode from the contracted display mode may be performed by a user's touch input performed on the display or a user's separate hardware button manipulation, by an external force applied to the mobile terminal 100 by the user, or by an occurrence of a preset event (e.g., phone call reception, message reception, etc.) in no relation to the manual manipulation.

Then, as shown in FIG. 15 (15-2), the controller 180 may control a plurality of layout indicators 2111, 2112, 2113, and 2114, which are provided to configure a display layout of two or more application execution screens, to be displayed on the first region 2100 of the front display region. As described above, the first indicator 2111 may be pre-selected as a default from them. Of course, other indicators may be selected.

In addition, as described above, the controller 180 may control the second region 2200 of the front display region to be divided according to the display layout by the selected first indicator 2111.

In doing so, the first application execution screen may keep being displayed on the left region 220A of the second region 2200.

Next, as shown in FIG. 16 (16-1), a user command for proceeding to a next step may be inputted. As described above, the user command may be inputted, for example, by touching the next icon 2302.

Then, as shown in FIG. 16 (16-2), the controller 180 may control a plurality of the application icons to be displayed on the first area 2100 of the front display region. When a plurality of the application icons are displayed on the first region 2100, a plurality of the layout indicators may no longer be displayed.

Thereafter, as a second indicator is selected from a plurality of the layout indicators, the first application execution screen and the second application execution screen may be simultaneously displayed on the mobile terminal 100 in a multi-tasking manner, as described with reference to FIGS. 11 to 13.

In addition, as the mobile terminal 100 returns from the extended display mode to the contracted display mode, the first application execution screen and the second application execution screen are simultaneously displayed on the mobile terminal 100 in a multi-tasking manner, as described with reference to FIG. 14.

Figure 17:
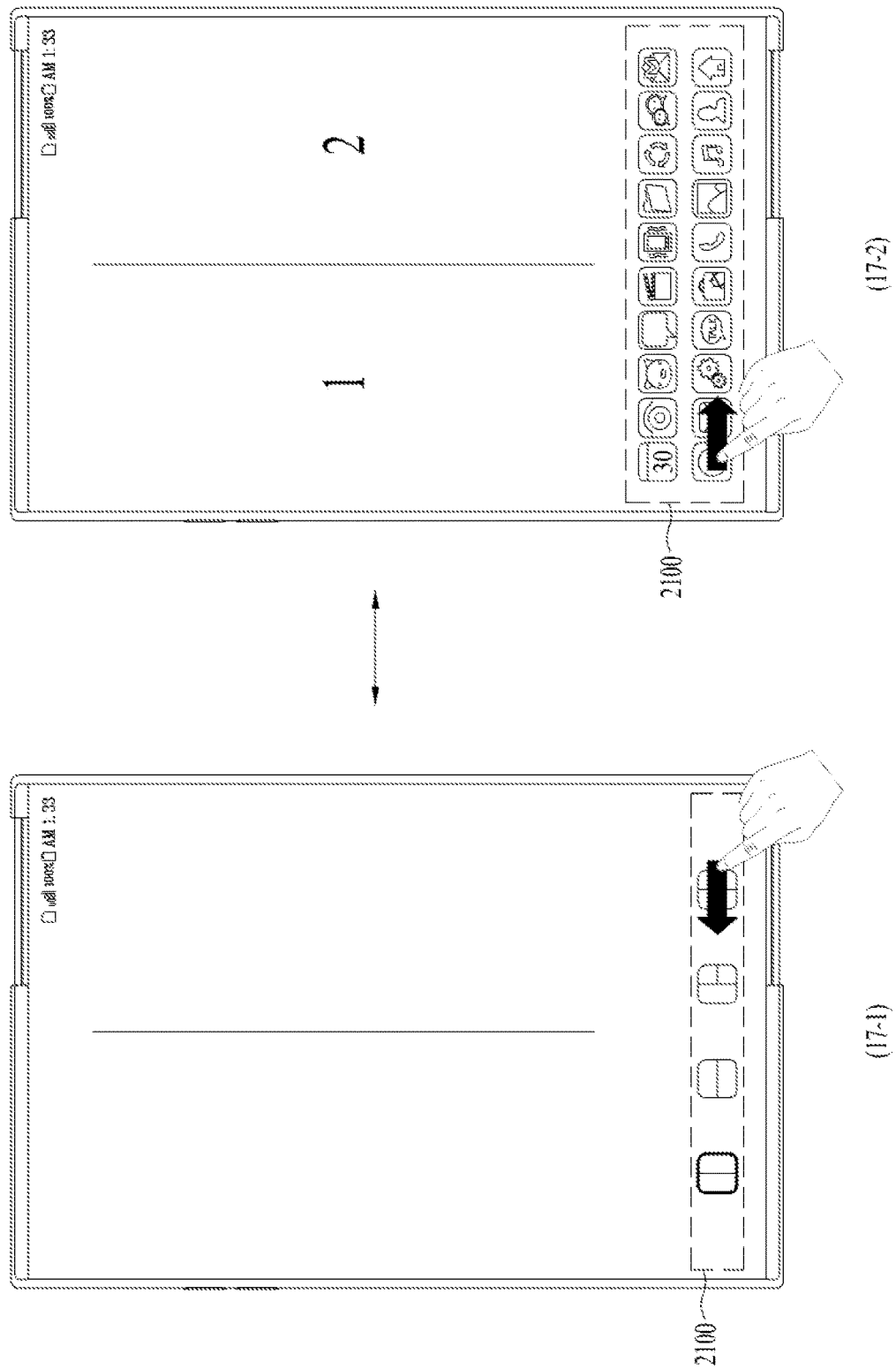
FIG. 17 shows a front display region in an extended display mode according to one embodiment of the present disclosure.

Meanwhile, as described in FIG. 9 and FIG. 10, it has been described that the next icon 2302 is selected as a user command for displaying a plurality of the application icons instead of a plurality of the layout indicators on the first region 2100. Hereinafter, with reference to FIG. 17, it will be described that a plurality of the application icons are made to be displayed instead of a plurality of the layout indicators on the first region 2100 through another user command. FIG. 17 shows a front display region in an extended display mode according to one embodiment of the present disclosure.

In FIG. 17 (17-1), after an indicator corresponding to a display layout desired by a user is touched and selected, a touch drag gesture in a first direction may be performed on the first region 100 on which a plurality of the layout indicators are being displayed.

Then, as shown in FIG. 17 (17-2), the controller 180 may control a plurality of the application icons to be displayed instead of a plurality of the layout indicators on the first region 2100.

In addition, a touch drag gesture in a second direction may be performed on the first region 2100 on which a plurality of the application icons are being displayed. The second direction may be a direction opposite to the first direction.

Then, as shown in FIG. 17 (17-1), the controller 180 may control a plurality of the layout indicators to be displayed instead of a plurality of the application icons on the first region 2100.

In the above description, a case where a plurality of the layout indicators are displayed when the mobile terminal 100 switches from the contracted display mode to the extended display mode has been described [S61, S63].

Figure 18:
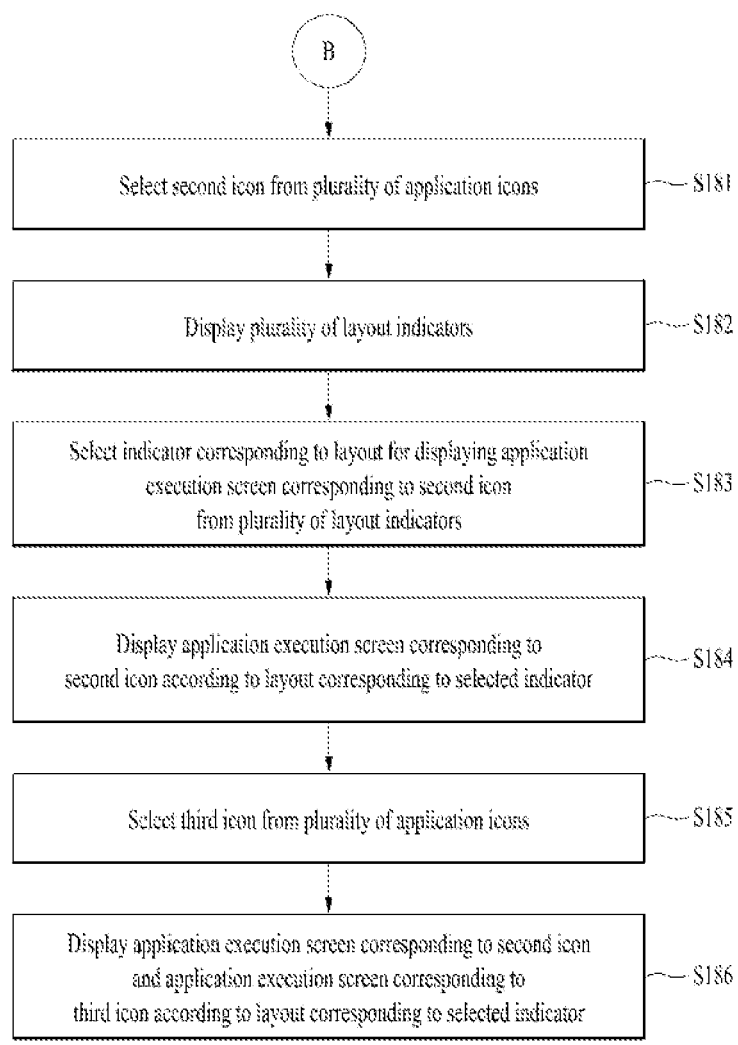
FIG. 18 is an additional flowchart of layout configuration of two or more application execution screens through a plurality of application icons according to one embodiment of the present disclosure.
Figure 19:
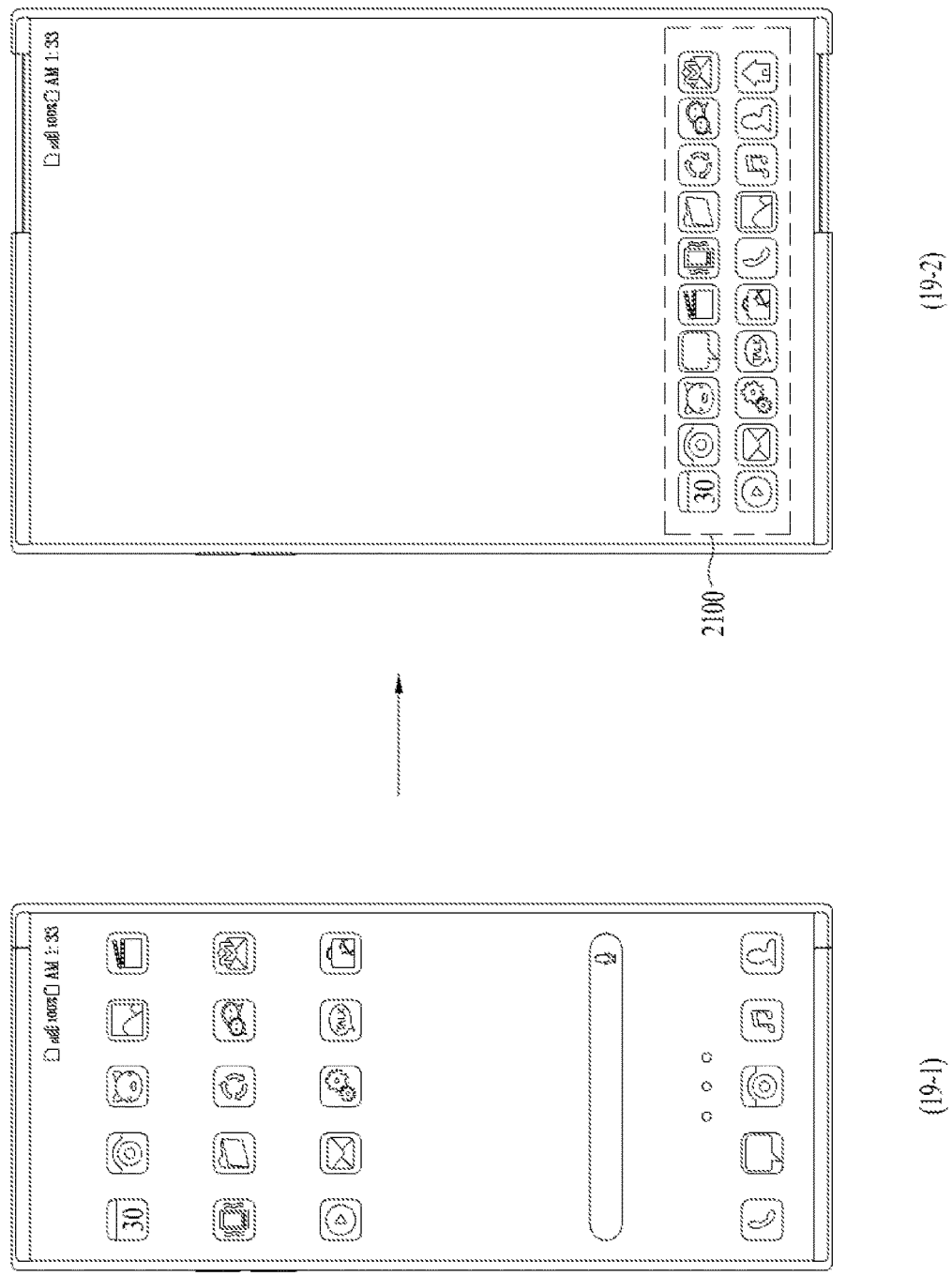
FIG. 19 shows a front display region when a contracted display mode is switched to an extended display mode according to one embodiment of the present disclosure.
Figure 21:
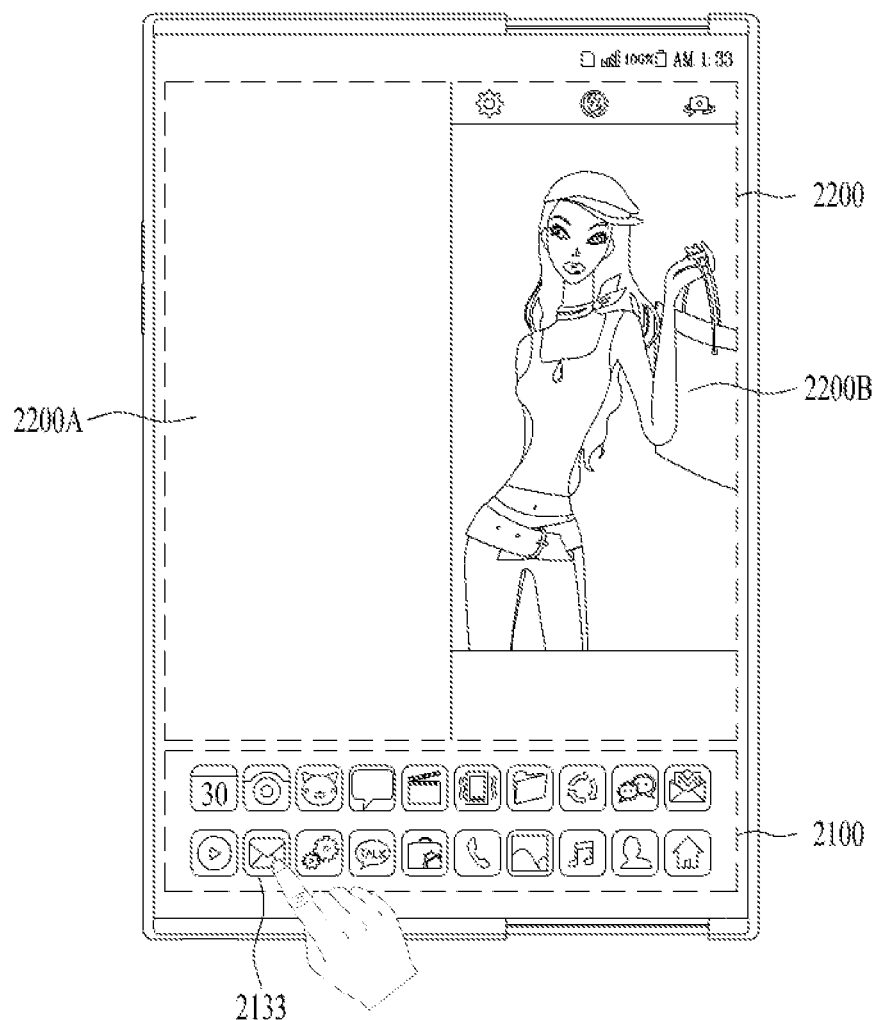
Figure 22:
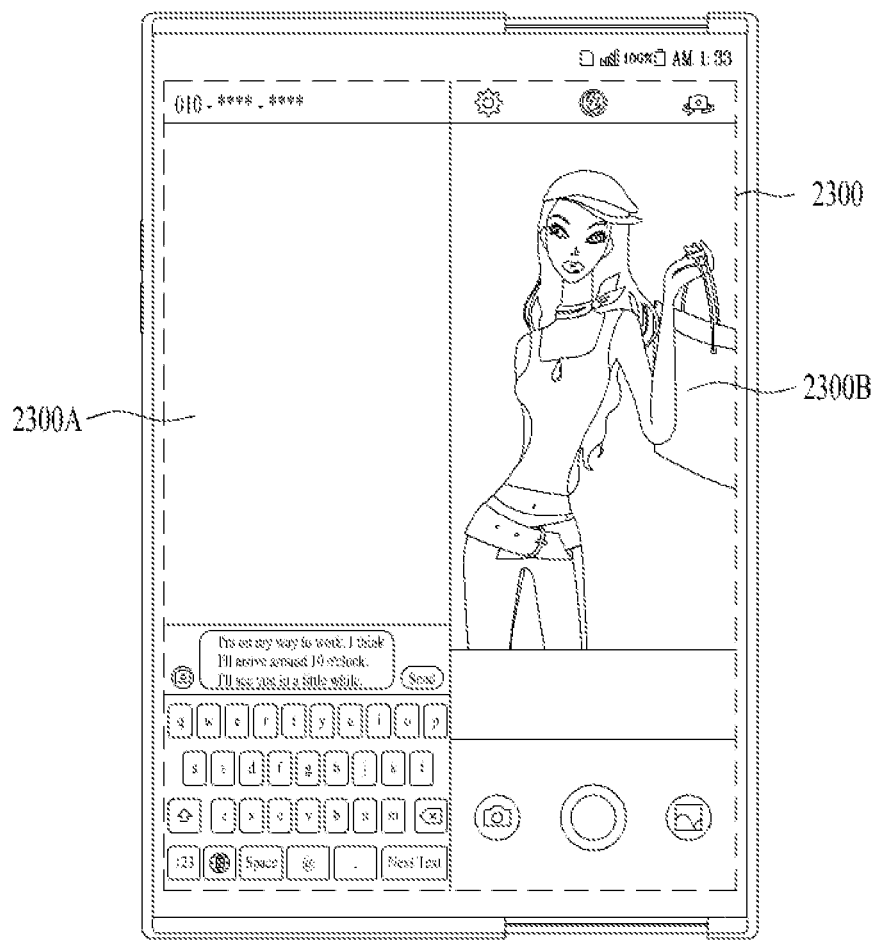

Hereinafter, a case in which a plurality of the application icons are displayed when the mobile terminal 100 switches from the contracted display mode to the extended display mode will be described [S61, S65]. This will be described further with reference to FIGS. 18 to 22. FIG. 18 is an additional flowchart of layout configuration of two or more application execution screens through a plurality of application icons according to one embodiment of the present disclosure. FIG. 19 shows a front display region when a contracted display mode is switched to an extended display mode according to one embodiment of the present disclosure. FIGS. 20 to 22 show a front display region in an extended display mode according to one embodiment of the present disclosure.

As shown in FIG. 19 (19-1), the mobile terminal 100 may display the home screen during the contracted display mode. Although not illustrated, the lock screen or the AOD screen may be displayed instead of the home screen during the contracted display mode. Since the home screen, the lock screen, and the AOD screen are the same as described above, a detailed description thereof will be omitted.

In this case, the mobile terminal 100 may switch from the contracted display mode to the extended display mode [S61].

Then, as shown in FIG. 19 (19-2), the controller 180 may control a plurality of the application icons to be displayed on the first region 2100 of the front display region [S65].

As shown in FIG. 20 (20-1), one icon, for example, a second icon 2132, may be touched and selected from a plurality of the application icons [S181].

The controller 180 may control first to fourth layout indicators 2141, 2142, 2143, and 2144 to be displayed [S182]. Each of the first to fourth layout indicators 2141, 2142, 2143, and 2144 represents a different layout for displaying an application execution screen corresponding to the second icon. The first layout indicator 2141 may be configured to display the application execution screen corresponding to the second icon on the left region 2200A of the second region 2200 shown in FIG. 9 (9-1). The second layout indicator 2142 may be configured to display the application execution screen corresponding to the second icon on the right region 2200B of the second area 2200 shown in FIG. 9 (9-1). The fourth layout indicator 2144 may be configured to display the application execution screen corresponding to the second icon on the bottom region 2200D of the second region 2200 shown in FIG. 9 (9-2).

Among the first to fourth layout indicators 2141, 2142, 2143, and 2144, for example, the second layout indicator 2142 may be touched and selected [S183].

The second icon 2132 and the second layout indicator 2142 may be selected by a continuous touch action without having to be touched separately. For example, while the touch to the second icon 2132 is maintained, the first to fourth layout indicators 2141, 2142, 2143, and 2144 may be displayed. Subsequently, the touch is dragged from the second icon 2132 to the second layout indicator 2142 and then released from the second layout indicator 2142, whereby the second icon 2132 and the second layout indicator 2142 may be selected.

Then, as shown in FIG. 21, the controller 180 may control the application execution screen corresponding to the second icon to be displayed on the right region 2200B of the second region 2200 [S184].

Then, a third application icon 2133 (e.g., a message application icon) may be touched and selected from a plurality of the application icons in the first region 2100 [S185].

Then, as shown in FIG. 22, the controller 180 may divide the third region 2300 including the first region 2100 and the second region 2200 into a new left region 2300A and a new right region 2300B according to a display layout corresponding to the second layout indicator 2142 and then control an application execution screen corresponding to a third icon and a second application execution screen to be displayed on the left region 2300A and the right region 2300B, respectively [S186].

Accordingly, on the mobile terminal 100, the second application execution screen and the third application execution screen may be simultaneously displayed in a layout desired by a user in a multitasking manner.

Figure 23:
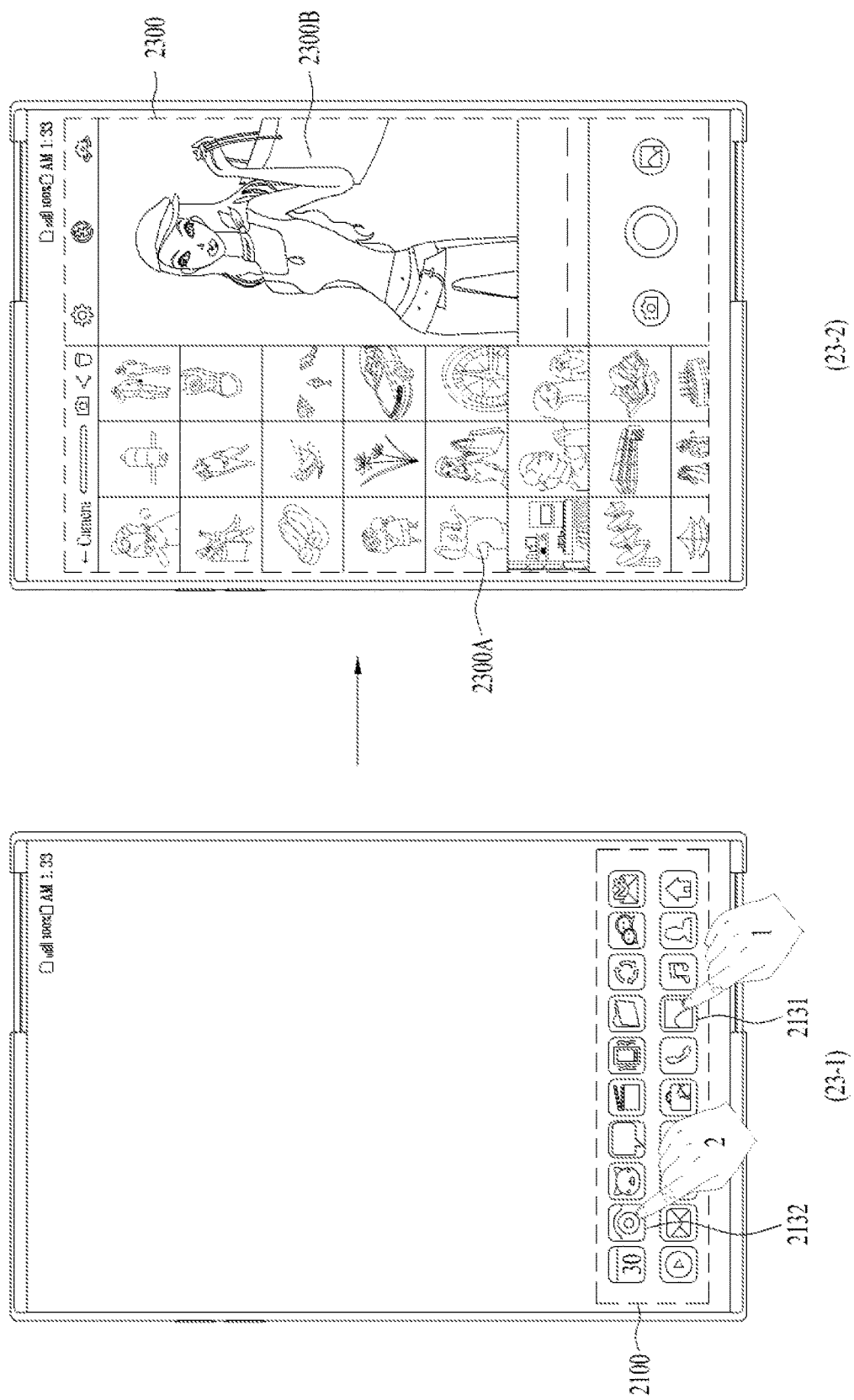

In the above, it has been described that a user directly selects a layout for simultaneously displaying two or more application execution screens. However, embodiments of the present invention are not limited thereto. For example, a layout for the mobile terminal 100 to simultaneously display execution screens of two or more applications may be recommended based on properties of at least one of the two or more applications. This will be described with further reference to FIG. 23 and FIG. 24. FIG. 23 and FIG. 24 show a front display region in an extended display mode according to one embodiment of the present disclosure.

As shown in FIG. 23, a first icon 2131 and a second icon 2132 may be sequentially touched and selected from a plurality of the application icons displayed on the first region 2100 in the extended display mode.

Then, the controller 180 may automatically determine a display layout based on application properties of at least one of a first application corresponding to the first icon and a second application corresponding to the second icon. The application properties may relate to an execution screen graphic configuration. Alternatively, the application properties may include a past history of a layout (e.g., portrait/landscape layout) mainly used by a user when the corresponding application is executed.

Next, the controller 180 may control the execution screens of the first and second applications to be simultaneously displayed in a multitasking manner according to the automatically determined display layout. For example, as shown in FIG. 23 (23-2), after dividing the third region 2300 including the first region 2100 and the second region 2200 into the new left region 2300A and the new right region 2300B, the execution screen of the first application may be displayed on the left region 2300A and the execution screen of the second application may be displayed on the right region 2300B.

In some implementations, as shown in FIG. 24, a fourth icon 2134 and a fifth icon 2135 may be sequentially touched and selected from a plurality of the application icons displayed on the first region 2100 in the extended display mode.

Then, the controller 180 may automatically determine a display layout based on properties of at least one of a fourth application (e.g., a timer application) corresponding to the fourth icon 2134 and a fifth application (e.g., a setting application) corresponding to the fifth icon 2135. The above properties are the same as described above.

Next, the controller 180 may control the execution screens of the fourth and fifth applications to be simultaneously displayed in a multitasking manner according to the automatically determined display layout. For example, after dividing the third region 2300 including the first region 2100 and the second region 2200 into a new top region 2300C and a new bottom region 2300D, the execution screen of the fourth application may be displayed on the top region 2300C and the execution screen of the fifth application may be displayed on the bottom region 2300D.

Figure 25:
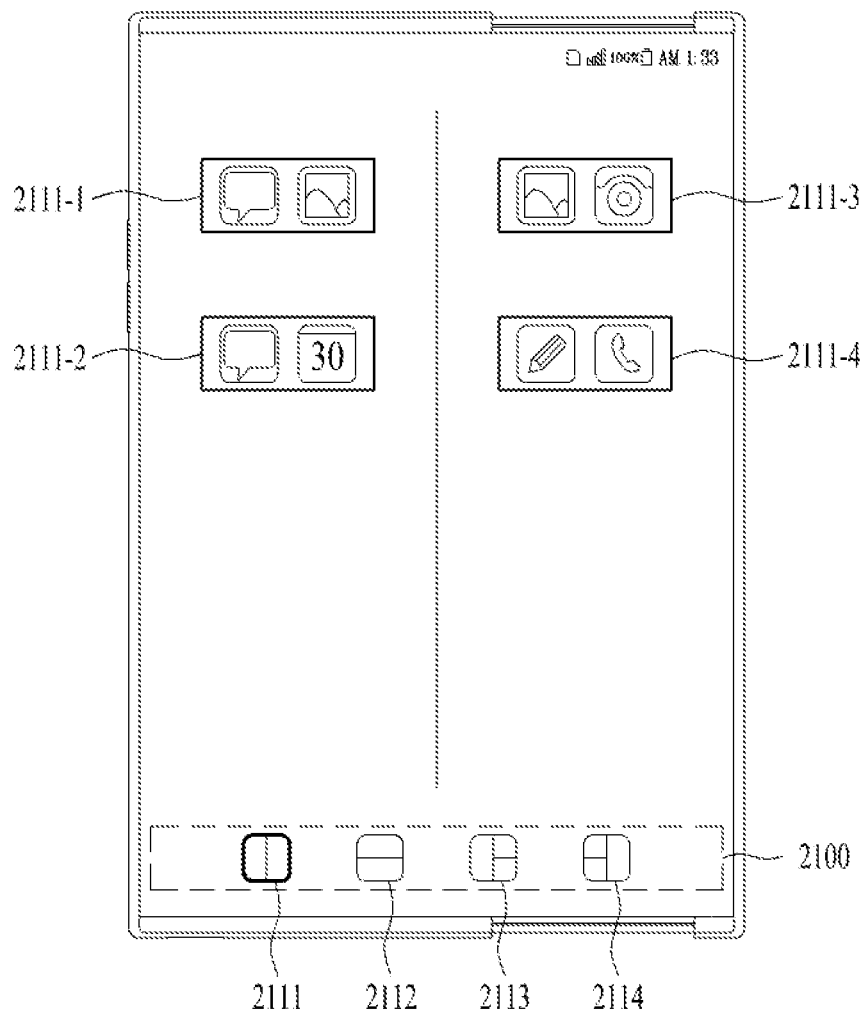
FIGS. 25 to 27 show a front display region in an extended display mode according to one embodiment of the present disclosure.
Figure 26:
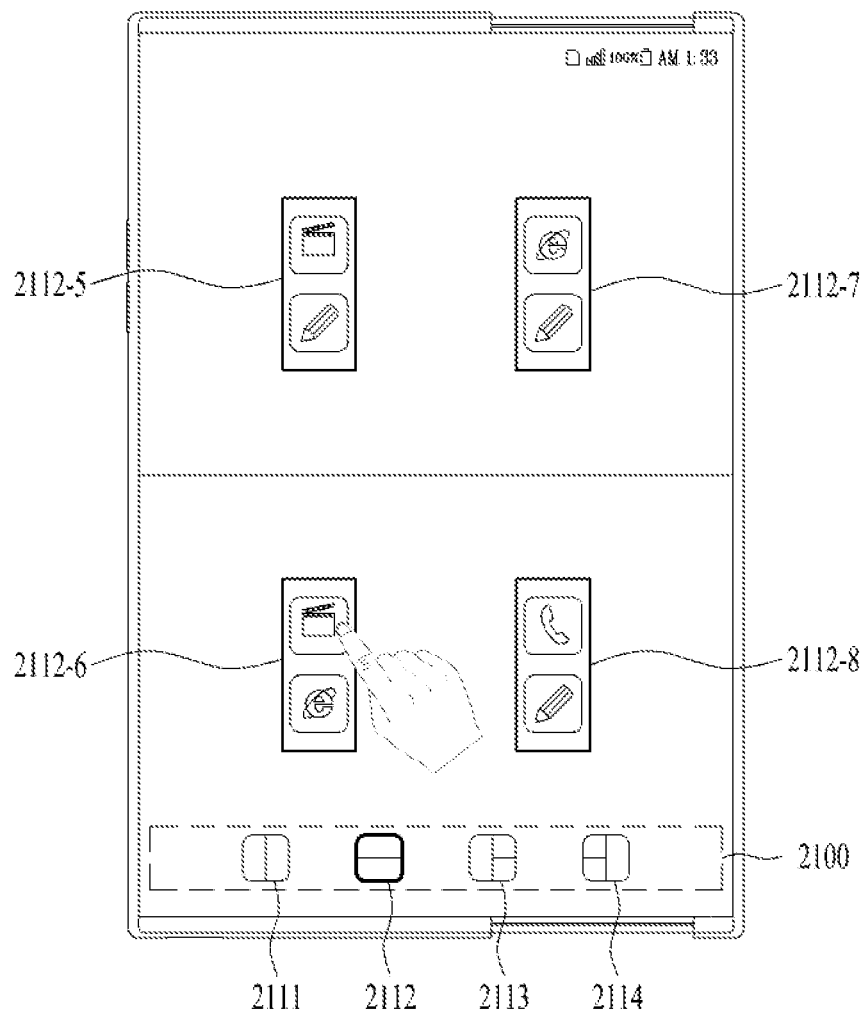
Figure 27:
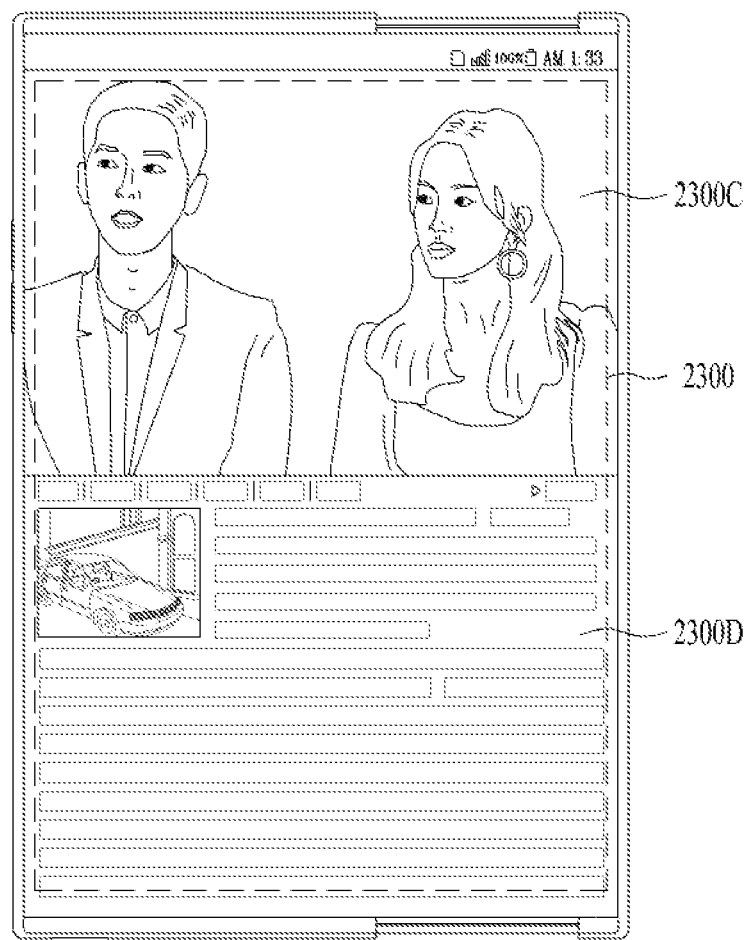

In the above description, when two applications are selected from a plurality of applications, a layout for simultaneously displaying execution screens of the two applications is automatically determined. However, embodiments of the present invention are not limited thereto. When one layout is selected from a plurality of display layouts, at least one application set suitable for the selected layout may be automatically recommended. The application set may include two or more applications. This will be described with further reference to FIGS. 25 to 27. FIGS. 25 to 27 show a front display region in an extended display mode according to one embodiment of the present disclosure.

As shown in FIG. 25, a first indicator 2111 may be selected from a plurality of the layout indicators displayed on the first region 2100 in the extended display mode. Then, the controller 180 may display at least one application set suitable for a display layout of the first indicator 2111. In FIG. 25, a first application set 2111-1 including a message application and a gallery application, a second application set 2111-2 including a message application and a calendar application, a third application set 2111-3 including a gallery application and a camera application, and a fourth application set 2111-4 including a memo application and a phone application are illustrated.

In some implementations, as shown in FIG. 26, a second indicator 2112 may be selected from a plurality of the layout indicators displayed on the first region 2100 in the extended display mode. Then, the controller 180 may display at least one application set suitable for a display layout of the second indicator 2112. In FIG. 26, a fifth application set 2112-5 including a YouTube application and a memo application, a sixth application set 2112-6 including an Internet application and a memo application, a seventh application set 2112-7 including a YouTube application and an Internet application, and an eighth application set 2112-8 including a phone application and a memo application are illustrated.

Applications included in each application set may be determined based on application properties. The application properties may relate to an execution screen graphic configuration. Alternatively, the application properties may include a past history of a layout (e.g., portrait/landscape layout) mainly used by a user when the corresponding application is executed.

From the application sets, the seventh application set 2112-2 may be touched and selected.

Then, as shown in FIG. 27, the controller 180 may control execution screens of applications of the seventh application set 2112-2 to be simultaneously displayed in a multitasking manner according to a display layout corresponding to the selected second indicator. For example, the execution screen of the YouTube application may be displayed on the top region 2300C, and the execution screen of the Internet application may be displayed on the bottom region 2300D.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A mobile terminal, comprising:
a body;
a display coupled to the body to vary a front display region visible from a front side of the body and a rear display region visible from a rear side of the body, based on switching between an extended display mode and a contracted display mode; and
a controller configured to:
display a home screen on the front display region of the display in the contracted display mode,
in response to enlarging the front display region of the display and decreasing the rear display region of the display by switching the contracted display mode to the extended display mode, control a plurality of layout indicators for a plurality of application execution screens to be displayed, instead of the home screen, at a first region of the enlarged front display region of the display,
in response to selecting one of the plurality of layout indicators, and while the plurality of layout indicators continue to be displayed at the first region, the enlarged front display region is to be visibly divided at a second region of the enlarged front display region according to a layout corresponding to the selected indicator, wherein the first region and the second region do not overlap, and
in response to an input while the plurality of layout indicators continue to be displayed at the first region, the plurality of layout indicators are no longer displayed, a plurality of application icons are displayed at the first region, and the enlarged front display region continues to be visibly divided at the second region.

2. The mobile terminal of claim 1, wherein in response to selecting a first icon and a second icon from the plurality of application icons, the controller controls a first application execution screen corresponding to the first icon and a second application execution screen corresponding to the second icon to be displayed according to the layout.

3. The mobile terminal of claim 1, wherein in response to the selecting one of the plurality of layout indicators, the controller controls to display at least one or more application sets suitable for a layout corresponding to the selected indicator.

4. The mobile terminal of claim 3, wherein in response to selecting one of the at least one or more application sets, the controller controls a plurality of application execution screens corresponding to the selected set to be displayed according to the layout corresponding to the selected indicator.

5. The mobile terminal of claim 3, wherein the controller provides the at least one or more application sets based on a history of applications used by a user so far to match the layout corresponding to the selected indicator.

6. The mobile terminal of claim 1, wherein the controller controls the home screen displayed before switching from the contracted display mode to the extended display mode so as not to be displayed after switching from the contracted display mode to the extended display mode.

7. The mobile terminal of claim 6, wherein the controller controls the home screen to be displayed again in response to returning from the extended display mode to the contracted display mode.

8. The mobile terminal of claim 1, wherein the body comprises a first frame and a second frame configured extendable from the first frame and coupled to the first frame in a manner of being retractable into the first frame, wherein the display comprises a flexible display capable of enclosing the front side, lateral side and the rear side of the body, and wherein the controller controls to operate in the extended display mode based on extending the second frame or operate in the contracted display mode based on contracting the second frame.

9. The mobile terminal of claim 8, wherein the flexible display is coupled to the body in a manner that a display part located on the lateral side of the body at least is moved to the front side of the body based on extending the second frame to increase the front display region viewed from the front side of the body in the extended display mode.

10. The mobile terminal of claim 9, wherein the flexible display is coupled to the body in a manner that a display part located on the rear side of the body is moved to the front side of the body through the lateral side of the body as the display part located on the lateral side of the body is moved to the front side of the body.

11. The mobile terminal of claim 10, wherein the flexible display is coupled to the body in a manner that a display part located on the front side of the body is moved to the lateral side of the body or to the rear side via the lateral side based on contracting the second frame to decrease the front display region viewed from the front side of the body.

12. The mobile terminal of claim 8, further comprising a drive unit moving the second frame to slide to be extended or contracted.

13. The mobile terminal of claim 8, further comprising a side frame to cover the flexible display enclosing the lateral side of the body.

14. The mobile terminal of claim 1, wherein the display comprises a flexible display having a first side edge located on a front face of the mobile terminal and a second side edge located on a rear face of the mobile terminal, and wherein the body comprises:
a first frame;
a second frame coupled to the first frame to permit changing of relative positioning of the first frame and the second frame between an extended position in the extended display mode and a retracted position in the contracted display mode;
a slot formed in a rear portion of the second frame; and
a third frame coupled to the slot of the second frame and being further coupled to a side edge of the flexible display to permit movement of the flexible display relative to the second frame along a direction of the slot.

15. The mobile terminal of claim 1, wherein the display comprises a flexible display, and wherein the body comprises:
a first frame;
a second frame being slidably coupled to the first frame to permit extending of the second frame relative to the first frame according to movement in a first direction and retracting the second frame relative to the first frame according to movement in a second direction that is opposite that of the first direction; and
a third frame coupled to the slot of the second frame and being further coupled to a side edge of the flexible display to permit movement of the flexible display relative to the second frame along a direction of the slot.

16. The mobile terminal of claim 1, wherein the controller is further configured to:
in response to selecting a first icon and a second icon from the plurality of application icons, cause the display to display a first application execution screen corresponding to the first icon according to the layout, cause the display to display a second application execution screen corresponding to the second icon according to the layout, and no longer display the plurality of application icons, and
in response to decreasing the front display region of the display and increasing the rear display region of the display by switching from the extended display mode to the contracted display mode, cause the display to display only one of the first application execution screen or the second application execution screen, on the decreased front display region of the display.

17. A method of controlling a mobile terminal having a body and a display coupled to the body to vary a front display region visible from a front side of the body and a rear display region visible from a rear side of the body, based on switching between an extended display mode and a contracted display mode, the method comprising:
displaying a home screen on the front display region of the display in the contracted display mode;
switching from the contracted display mode to the extended display mode;
in response to enlarging the front display region of the display and decreasing the rear display region of the display, controlling a plurality of layout indicators for a plurality of application execution screens to be displayed, instead of the home screen, at a first region of the enlarged front display region of the display,
in response to selecting one of the plurality of layout indicators, and while the plurality of layout indicators continue to be displayed at the first region, controlling the enlarged front display region to be visibly divided at a second region of the enlarged front display region according to a layout corresponding to the selected indicator, wherein the first region and the second region do not overlap, and
in response to an input while the plurality of layout indicators continue to be displayed at the first region, the plurality of layout indicators are no longer displayed, displaying a plurality of application icons at the first region, and the enlarged front display region continues to be visibly divided at the second region.

* * * * *